US012272904B2

(12) United States Patent
Shimomura et al.

(10) Patent No.: US 12,272,904 B2
(45) Date of Patent: Apr. 8, 2025

(54) ELECTRICAL CONNECTOR WITH SHIELDING BETWEEN LOW AND HIGH FREQUENCY TERMINALS AND ELECTRICAL CONNECTOR DEVICE USING THE SAME

(71) Applicant: Panasonic Intellectual Property Management Co., Ltd., Osaka (JP)

(72) Inventors: Ryosuke Shimomura, Mie (JP); Yoji Miyazaki, Mie (JP); Hiroshi Tanaka, Osaka (JP); Kazumasa Iijima, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/300,922

(22) Filed: Apr. 14, 2023

(65) Prior Publication Data

US 2023/0253738 A1 Aug. 10, 2023

Related U.S. Application Data

(63) Continuation of application No. 17/134,666, filed on Dec. 28, 2020, now Pat. No. 11,664,628.

(30) Foreign Application Priority Data

Jan. 15, 2020 (JP) ................................ 2020-004743

(51) Int. Cl.
*H01R 13/6585* (2011.01)
*H01R 12/71* (2011.01)
(Continued)

(52) U.S. Cl.
CPC ....... *H01R 13/6585* (2013.01); *H01R 12/716* (2013.01); *H01R 13/50* (2013.01);
(Continued)

(58) Field of Classification Search
CPC .. H01R 13/6585; H01R 12/716; H01R 13/50; H01R 13/6594; H01R 12/712; H01R 12/73; H01R 13/6581
See application file for complete search history.

(56) References Cited

U.S. PATENT DOCUMENTS 5,645,436 A 7/1997 Shimizu et al.
10,446,985 B2 10/2019 Ooi
(Continued)

FOREIGN PATENT DOCUMENTS

CN 214589311 U 11/2021
JP 6-243936 A 9/1994
(Continued)

OTHER PUBLICATIONS

Non-Final Office Action dated Jan. 24, 2022 issued in U.S. Appl. No. 17/134,666.
(Continued)

*Primary Examiner* — Justin M Kratt
(74) *Attorney, Agent, or Firm* — Rimon P.C.

(57) ABSTRACT

A connector includes plural terminals, a housing holding the terminals, and an inner shield. The connector is configured to be connected to a mating connector by moving toward the mating connector in a first direction relatively with respect to the mating connector. The terminals include two terminals arranged on both sides of the inner shield in a second direction perpendicular to the first direction. The inner shield includes a base extending in a third direction perpendicular to the first direction and the second direction, and an extension protruding from the base. The housing includes a shield holder holding the extension. This connector reduces noise propagation between the terminals.

20 Claims, 20 Drawing Sheets

(51) Int. Cl.

| | |
|---|---|
| ***H01R 13/50*** | (2006.01) |
| ***H01R 13/6594*** | (2011.01) |
| *H01R 12/73* | (2011.01) |
| *H01R 13/6581* | (2011.01) |

(52) U.S. Cl.
CPC ....... *H01R 13/6594* (2013.01); *H01R 12/712* (2013.01); *H01R 12/73* (2013.01); *H01R 13/6581* (2013.01)

(56) References Cited

U.S. PATENT DOCUMENTS

| | | | | |
|---|---|---|---|---|
| 2006/0063432 | A1 | 3/2006 | Chen | |
| 2018/0205165 | A1 | 7/2018 | Hoshiba et al. | |
| 2019/0173233 | A1 | 6/2019 | Horino et al. | |
| 2020/0212634 | A1* | 7/2020 | Teruki | H01R 12/73 |
| 2020/0244011 | A1 | 7/2020 | Kitazawa | |
| 2020/0350658 | A1 | 11/2020 | Park et al. | |
| 2021/0098952 | A1 | 4/2021 | Sloey et al. | |
| 2021/0111521 | A1 | 4/2021 | Amemori et al. | |
| 2021/0175649 | A1 | 6/2021 | Amemori et al. | |
| 2021/0175666 | A1* | 6/2021 | Zhang | H01R 13/6471 |
| 2021/0265790 | A1 | 8/2021 | Nakagawa | |

FOREIGN PATENT DOCUMENTS

| | | | |
|---|---|---|---|
| JP | 2008-041285 | A | 2/2008 |
| JP | 2009-259675 | A | 11/2009 |
| JP | 2013-182808 | | 9/2013 |
| JP | 2017-091893 | A | 5/2017 |
| JP | 2018-022631 | A | 2/2018 |
| JP | 2018-045992 | A | 3/2018 |
| JP | 2018-110087 | | 7/2018 |
| JP | 2018-116925 | A | 7/2018 |
| JP | 2019-121439 | A | 7/2019 |
| JP | 6635242 | B | 1/2020 |
| JP | 2021-108272 | A | 7/2021 |
| WO | 2020/003731 | A1 | 1/2020 |
| WO | 2020/040004 | A1 | 2/2020 |
| WO | 2020/085398 | A1 | 4/2020 |
| WO | 2020/256396 | A1 | 12/2020 |
| WO | 2021/029306 | A1 | 2/2021 |

OTHER PUBLICATIONS

Final Office Action dated May 27, 2022 issued in U.S. Appl. No. 17/134,666.

Non-Final Office Action dated Sep. 14, 2022 issued in U.S. Appl. No. 17/134,666.

Notice of Allowance dated Feb. 7, 2023 issued in U.S. Appl. No. 17/134,666.

Izuru Shinmura, "Kojien Chapter 7 (Partial English Translation)", Iwanami Shoten Company Ltd., Jan. 12, 2018 (Jan. 12, 2018), p. 1982.

* cited by examiner

ELECTRICAL CONNECTOR WITH SHIELDING BETWEEN LOW AND HIGH FREQUENCY TERMINALS AND ELECTRICAL CONNECTOR DEVICE USING THE SAME

CROSS-REFERENCE OF RELATED APPLICATIONS

This application is a Continuation of U.S. patent application Ser. No. 17/134,666, filed on Dec. 28, 2020 which claims the benefit of Japanese Patent Application No. 2020-004743, filed on Jan. 15, 2020, the entire disclosures of which Applications are incorporated by reference herein.

TECHNICAL FIELD

The present disclosure relates to a connector including a shield, and to a connector device including the connector.

DESCRIPTION OF RELATED ART

Japanese Patent Laid-Open Publication No. 2013-182808 discloses a connector and a shield cover covering the connector. The connector electrically connects a first circuit board to a second circuit board by engaging a socket installed on the first circuit board with a header installed on the second circuit board. The shield cover is engaged with an engagement portion formed on the first circuit board or the second circuit board. The connector includes plural contacts arranged in a single direction.

SUMMARY

A connector includes plural terminals, a housing holding the terminals, and an inner shield. The connector is configured to be connected to a mating connector by moving toward the mating connector in a first direction relatively with respect to the mating connector. The terminals include two terminals arranged on both sides of the inner shield in a second direction perpendicular to the first direction. The inner shield includes a base extending in a third direction perpendicular to the first direction and the second direction, and an extension protruding from the base. The housing includes a shield holder holding the extension.

This connector reduces noise propagation between the terminals.

DETAILED DESCRIPTION OF PREFERRED EMBODIMENT

(1) Overview

Figure 1:
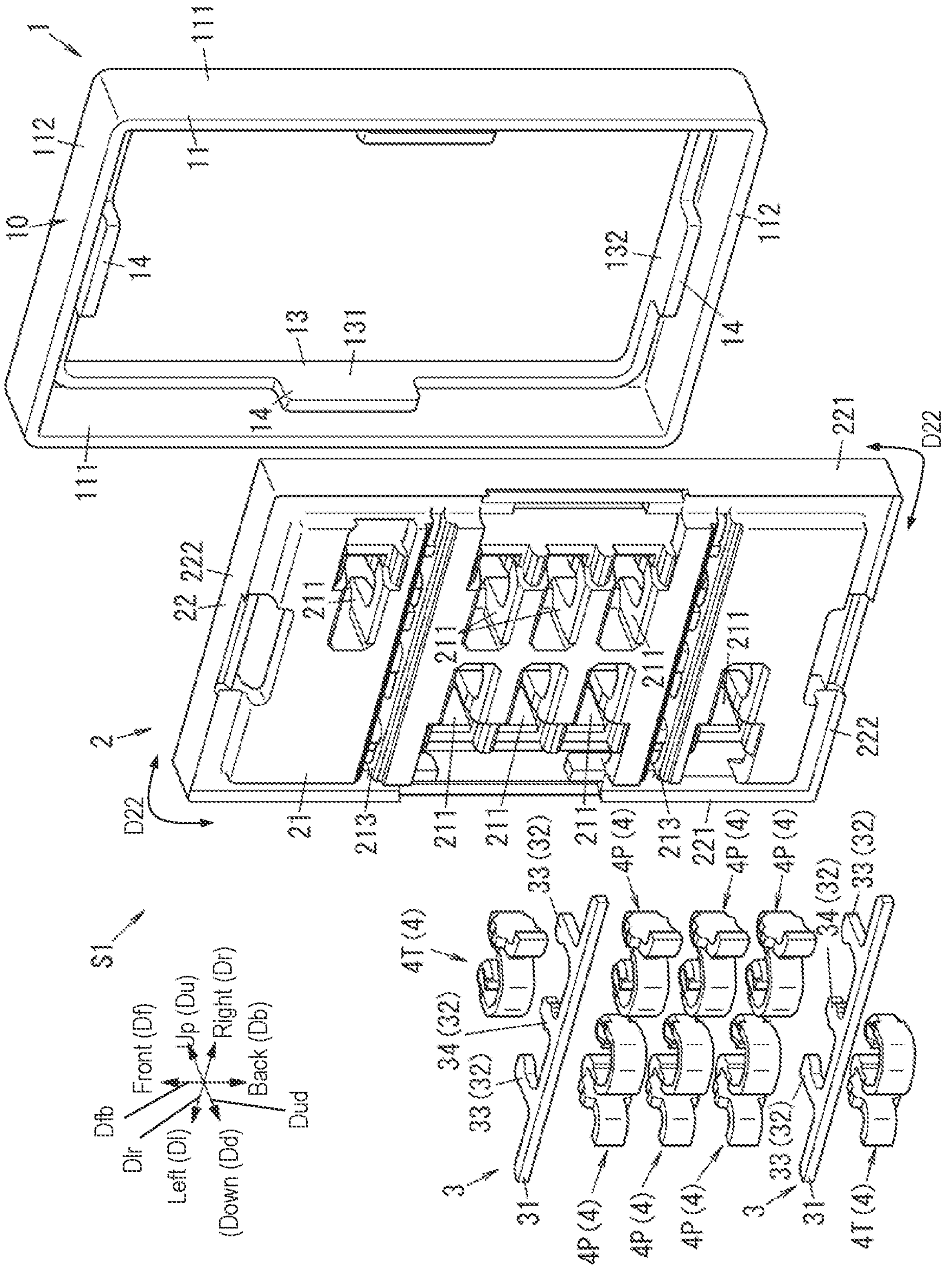
FIG. 1 is an exploded perspective view of a socket (connector) according to an exemplary embodiment.

A connector and a connector device according to an exemplary embodiment will be described below with reference to drawings. The following exemplary embodiment is just one of various exemplary embodiments of the present disclosure. The following exemplary embodiment can be variously modified in accordance with the design and the like as long as the object of the present disclosure can be achieved. The drawings described in the following exemplary embodiment are schematic diagrams, and the ratio of the size and the thickness of each component in the drawings does not necessarily reflect the actual dimensional ratio.

Figure 11:
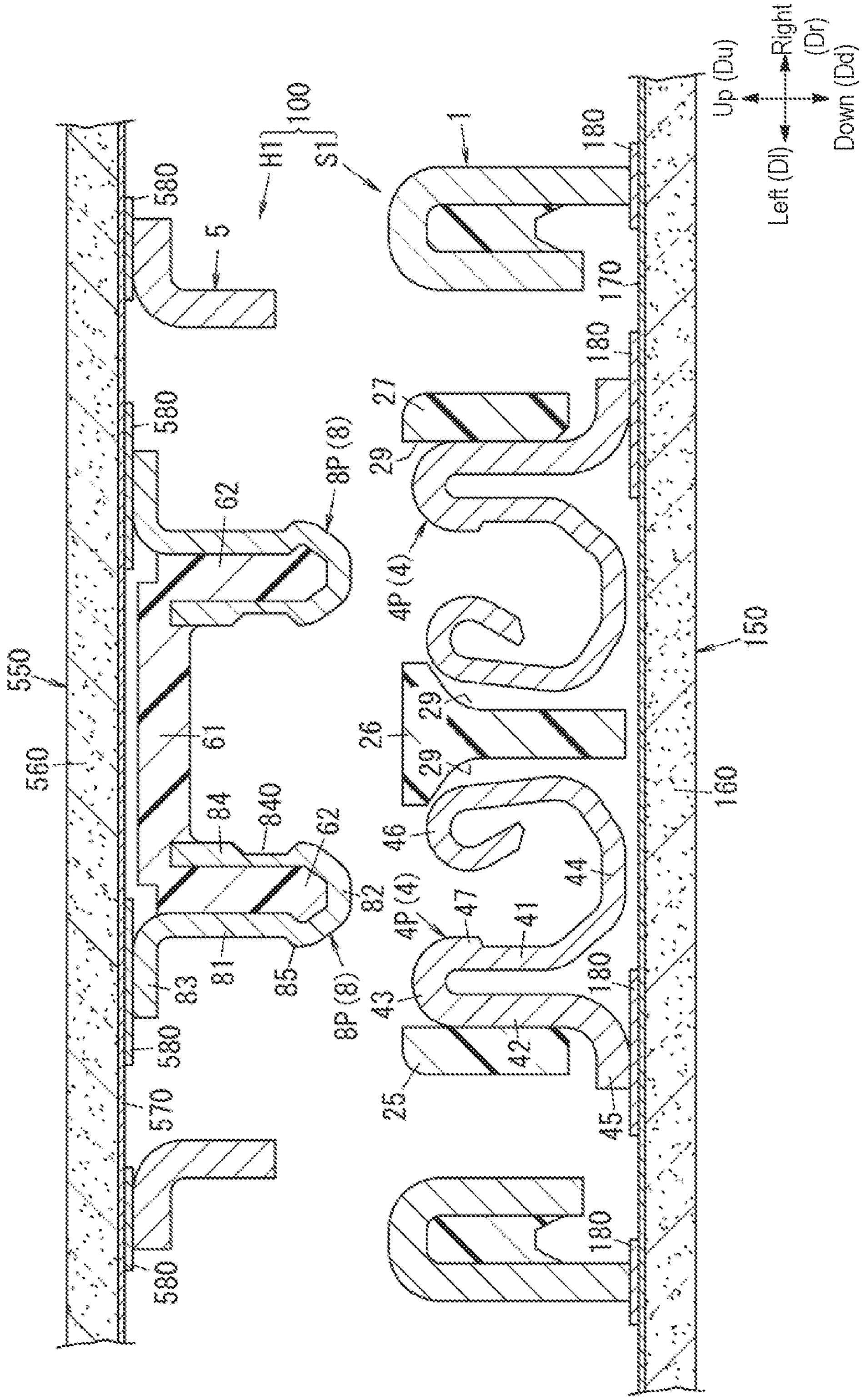
FIG. 11 is a sectional view of the connector where the socket is separated from the header, illustrating two terminals of each of the socket and the header.

As illustrated in FIG. 11, connector device 100 includes a first connector (socket S1) and a second connector (header H1). In the following description, the first connector is also referred to as a "socket S1", and the second connector is also referred to as a "header H1". Socket S1 is connected to header H1. At this moment, terminal 4 of socket S1 is electrically connected to a terminal 8 of header H1. When viewed from socket S1, header H1 is a "mating connector" connected to socket S1. On the contrary, when viewed from header H1, socket S1 is a "mating connector" connected to header H1. That is, connector device 100 includes the connector (socket S1 or header H1) and the mating connector. When viewed from socket S1, terminal 8 of header H1 is a "mating terminal" electrically connected to terminal 4 of socket S1. On the contrary, when viewed from header H1, terminal 4 of socket S1 is a "mating terminal" electrically connected to terminal 8 of header H1.

(1.1) Configuration 1

As illustrated in FIGS. 1, 5, 9, and 13, in the exemplary embodiment, the connector (socket S1 or header H1) includes outer shield 1 (or 5), terminal 4 (or 8), housing 2 (or 6), and inner shield 3 (or 7). Terminal 4 (or 8) is surrounded by outer shield 1 (or 5). Terminal 4 (or 8) is electrically connected to the mating terminal of the mating connector. Outer shield 1 (or 5) is fixed to housing 2 (or 6). Housing 2 (or 6) holds terminal 4 (or 8). Inner shield 3 (or 7) is surrounded by outer shield 1 (or 5). Inner shield 3 (or 7) includes two tip regions r1 (or r7). Two tip regions r1 (or r7) includes tip region r1 (or r7) that faces or is directly coupled to outer shield 1 (or 5) and tip region r1 (or r7) that faces or is directly coupled to outer shield 1 (or 5). The longest loop length of electrically-closed loops LO1, LO2, and LO3 that do not surround other electrically-closed loops among plural electrically-closed loops described below is shorter than the wavelength of a maximum frequency of a transmission signal flowing through terminal 4 (or 8). Each of tip regions r1 (or r7) of inner shield 7 is connected to outer shield 1 (or 5) by respective one of shortest distance L1 (or L7) via respective one of virtual paths W7 and W8 (or W9 and W10). Each of the plural electrically-closed loops includes outer shield 1 (or 5), inner shield 3 (or 7), and two virtual paths W7 and W8 (or W9 and W10), and surrounds terminal 4 (or 8). When viewed from socket S1, inner shield 7 of header H1 is a mating inner shield. On the contrary, when viewed from header H1, inner shield 3 of socket S1 is a mating inner shield. When viewed from socket S1, outer shield 5 of header H1 is a mating outer shield. On the contrary, when viewed from header H1, outer shield 1 of socket S1 is a mating outer shield.

The above configuration reduces resonance of a transmission signal in the electrically-closed loop.

In the present disclosure, the "maximum frequency of the transmission signal flowing through the terminal" means, in a case that the signal is transmitted through the terminal, the maximum frequency of a carrier wave of a signal, for example, when a radio frequency (RF) signal is transmitted, and means the frequency being harmonics of three to five times a clock frequency when a digital signal is transmitted. The maximum frequency has, for example, a value determined by a manufacturer or the like of a connector in accordance with the specifications of the connector, or a value determined by the standard or the like of the connector. The maximum frequency is described, for example, as the value of the maximum frequency of which the operation is guaranteed, in the specifications provided by the manufacturer.

(1.2) Configuration 2

As illustrated in FIGS. 1, 4, 5, 8, and 9, in the exemplary embodiment, the connector (socket S1 or header H1) includes outer shield 1 (or 5), terminal 4 (or 8), and housing 2 (or 6). Outer shield 1 (or 5) includes tubular portion (or 50). Both ends of tubular portion 10 (or 50) in a predetermined direction are open. Terminal 4 (or 8) is surrounded by outer shield 1 (or 5). Terminal 4 (or 8) is electrically connected to the mating terminal of the mating connector. Outer shield 1 (or 5) is fixed to housing 2 (or 6). Housing 2 (or 6) holds terminal 4 (or 8). Outer shield 1 (or 5) has distal end surface 102 (or 502) of tubular portion 10 (or 50), outer circumferential surface 101 (or 501) of tubular portion 10 (or 50), and inner circumferential surface 103 (or 503) of tubular portion 10 (or 50). Distal end surface 102 (or 502) is provided along the inner edge of tubular portion 10 (or 50) at one (which will be described next) of both ends of tubular portion 10 (or 50). One end is the end that is on the mating connector side when the connector and the mating connector are transitioned from the disconnected state to the connected state. At least one of distal end surface 102 (or 502), outer circumferential surface 101 (or 501), and inner circumferential surface 103 (or 503) is seamless over the entire circumference of tubular portion 10 (or 50) in circumferential direction D10 (or D50).

In the present disclosure, "seamless" means that there are no seams or breaks.

The above configuration reduces noise radiated from outer shield 1 (or 5) in comparison to a case where each of distal end surface 102 (or 502), outer circumferential surface 101 (or 501), and inner circumferential surface 103 (or 503) has seams or breaks.

In the connector as disclosed in Japanese Patent Laid-Open Publication No. 2013-182808, radiation noise may be generated even though the shield cover is attached.

On the other hand, the connector in the exemplary embodiment, as described above, reduces noise radiated from outer shield 1 (or 5).

(1.3) Configuration 3

Figure 5:
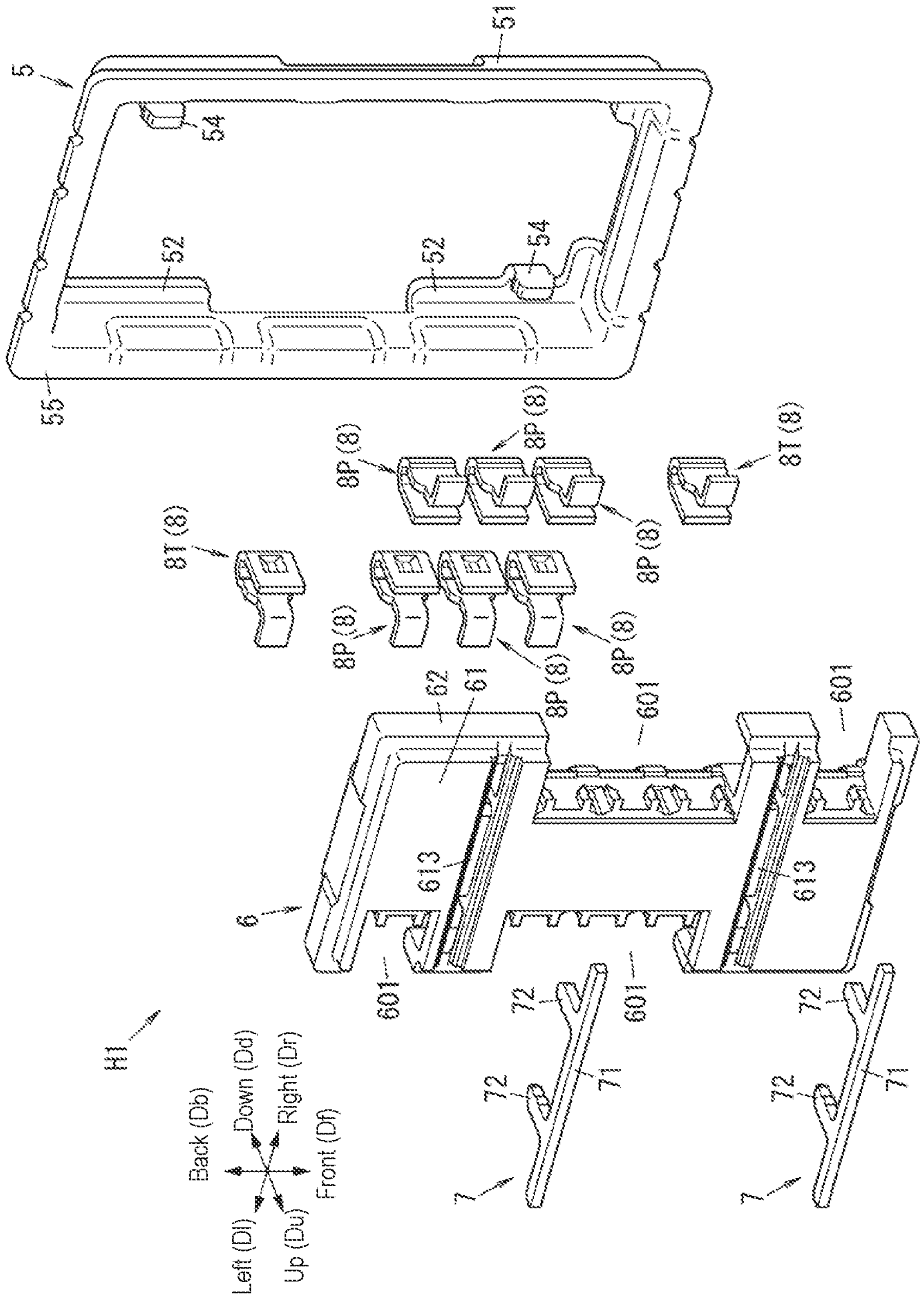
FIG. 5 is an exploded perspective view of a header (connector) according to the exemplary embodiment.
Figure 10:
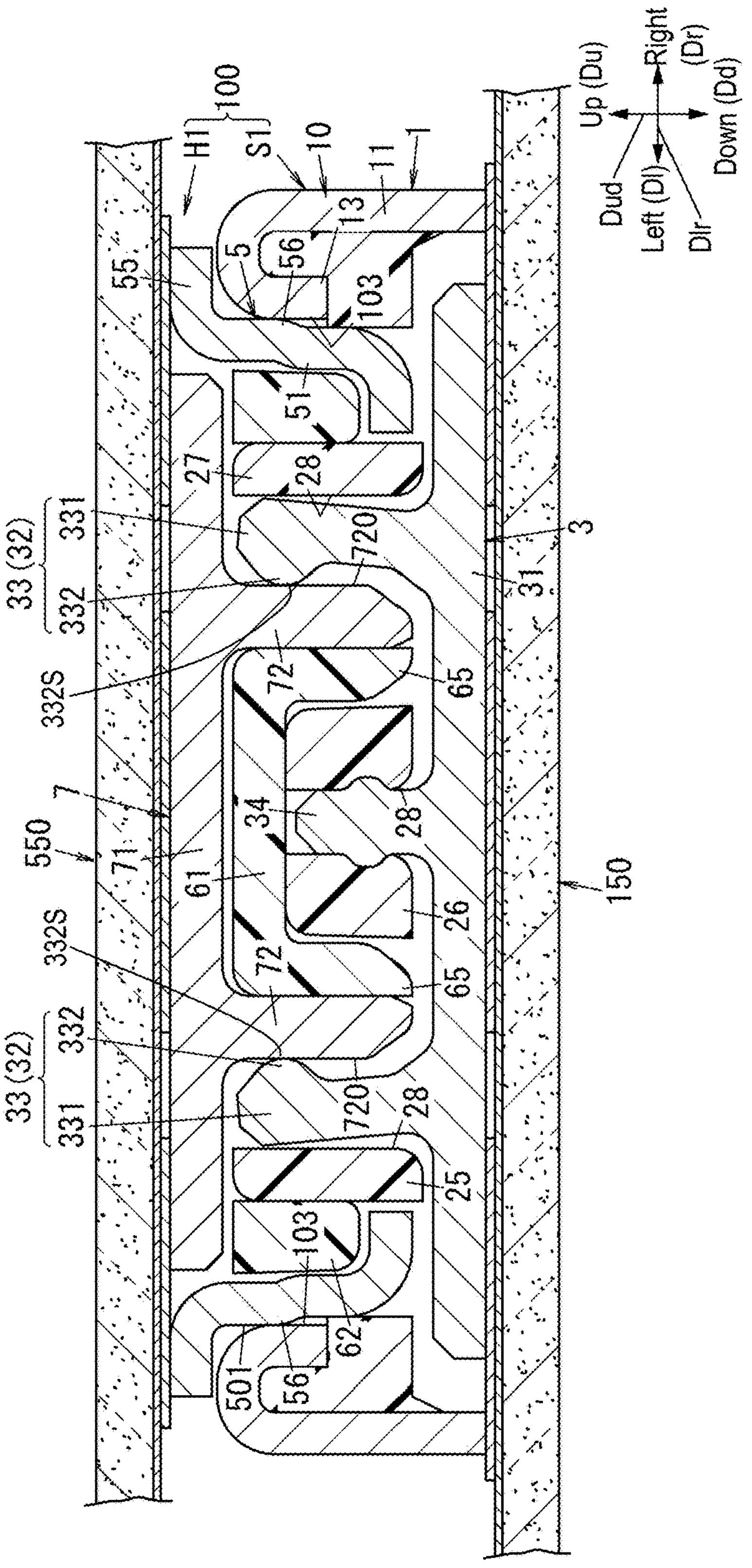
FIG. 10 is a sectional view of the connector where the socket is connected to the header, illustrating the inner shields of the socket and the header.

As illustrated in FIGS. 1, 5, and 10, in the exemplary embodiment, the connector (socket S1 or header H1) includes plural terminals 4 (or 8). Terminals 4 (or 8) are electrically connected to the mating terminals of the mating connector, respectively. The connector further includes housing 2 (or 6) and inner shield 3 (or 7). Housing 2 (or 6) holds terminals 4 (or 8). The connector is connected to the mating connector by moving at least one toward the other in up-down direction Dud relatively. Terminals 4 (or 8) include two terminals 4 (or 8). Two terminals 4 (or 8) are arranged on both sides of inner shield 3 (or 7) in front-back direction Dfb perpendicular to up-down direction Dud. Inner shield 3 (or 7) includes base 31 (or 71) and extension 32 (or 72). Base 31 (or 71) extends in left-right direction Dlr perpendicular to up-down direction Dud and front-back direction Dfb. Extension 32 (or 72) protrudes from base 31 (or 71) in up-down direction Dud. Housing 2 (or 6) includes a shield holder (accommodation portion 28 or 68). The shield holder holds extension 32 (or 72).

Since two terminals 4 (or 8) are arranged on both sides of inner shield 3 (or 7), the above configuration reduces noise propagation between two terminals 4 (or 8) more than a connector where inner shield 3 (or 7) is not provided. Since extension 32 (or 72) of the connector is positioned by the shield holder (accommodation portion 28 or 68), the accuracy of alignment between extension 32 (or 72) of the connector and the mating connector is improved. In the exemplary embodiment, extension 32 (or 72) of the connector is electrically connected to the inner shield of the mating connector. This configuration improves the accuracy of the electrical connection between extension 32 (or 72) of the connector and the inner shield of the mating connector.

In the connector disclosed in Japanese Patent Laid-Open Publication No. 2013-182808, radiation noise may be generated by the noise propagating between plural contacts (terminals).

On the other hand, the connector in the exemplary embodiment, as described above, reduces noise propagation between two terminals 4 (or 8).

(1.4) Configuration 4

As illustrated in FIGS. 1, 2, 5, and 6, in the exemplary embodiment, the connector (socket S1 or header H1) includes plural terminals 4 (or 8), housing 2 (or 6), and inner shield 3 (or 7). Terminals 4 (or 8) are electrically connected to the mating terminals of the mating connector, respectively. Housing 2 (or 6) holds terminals 4 (or 8). The connector is connected to the mating connector by moving at least one toward the other in up-down direction Dud relatively. In the exemplary embodiment, socket S1 being the connector is connected to header H1 by moving toward header H1 to header H1 being the mating socket in an upward direction Du being a predetermined direction relatively with respect to header H1. Terminals 4 (or 8) include two terminals 4 (or 8). Two terminals 4 (or 8) are arranged on both sides of inner shield 3 (or 7) in front-back direction Dfb perpendicular to up-down direction Dud.

The above configuration reduces noise propagation between two terminals 4 (or 8) more than a connector where inner shield 3 (or 7) is not provided.

In the above configuration, the connector preferably further include outer shield 1 (or 5). Outer shield 1 (or 5) surrounds terminals 4 (or 8) and inner shield 3 (or 7).

The connector including outer shield 1 (or 5) reduces the propagation or the radiation of noise between the inside and the outside of outer shield 1 (or 5).

(2) Details

The connectors (socket S1 and header H1) according to the exemplary embodiment will be detailed below with reference to FIGS. 1 to 14.

Unless otherwise specified, description will be made on the assumption that a direction in which socket S1 and header H1 are connected or separated to or from each other is up-down direction Dud, and header H1 side when viewed from socket S1 is upward direction Du. The description will be made on the assumption that the longitudinal direction of housing 2 of socket S1, which is perpendicular to up-down direction Dud, is front-back direction Dfb. The description will be made on the assumption that a direction perpendicular to up-down direction Dud and front-back direction Dfb, that is, the lateral direction of housing 2 is left-right direction Dlr. That is, in FIG. 1 and the like, as indicated by the arrows of "up", "down", "front", "back", "left", and "right", upward direction Du, downward direction Dd, forward direction Df, backward direction Db, leftward direction Dl, and rightward direction Dr are defined. The above directions are not intended to define the directions in which socket S1 and header H1 are used. The arrows indicating the directions in the drawing are shown only for the explanation, and are not accompanied by actual ones.

As described above, the connector and the mating connector are connected to each other by moving at least one toward the other in up-down direction Dud. In the exemplary embodiment, socket S1 and header H1 are connected to each other by at least one of a method in which socket S1 is disposed below header H1, and socket S1 moves in upward direction Du, and a method in which the socket is disposed below the header, and header H1 moves in downward direction Dd. Therefore, "the mating connector side when the connector and the mating connector are transitioned from the disconnected state to the connected state" means the upper side when socket S1 is used as the connector, and means the lower side when header H1 is used as the connector.

In the exemplary embodiment, socket S1 and header H1 are attached to circuit boards 150 and 550 (see FIG. 10) such as printed wiring boards or flexible printed wiring boards, respectively. Socket S1 and header H1 are used for electrically connecting plural circuit boards mounted into a portable terminal, such as a smartphone, for example. This description does not intend to limit the use of socket S1 and header H1, and socket S1 and header H1 may be used in an electronic device, such as a camera module, other than a portable terminal. The use of socket S1 and header H1 is not limited to the use of electrically connecting plural circuit boards to each other. The socket and the header may be used for electrically connecting plural components, for example, electrically connecting a circuit board and a display or electrically connecting a circuit board and a battery, to each other.

Socket S1 and header H1 may be provided in a state of not being connected to circuit boards 150 and 550, respectively, or may be provided in a state of being connected.

(2.1) Configuration of Socket

Firstly, a configuration of socket S1 according to the exemplary embodiment will be described.

Socket S1 is two-fold symmetrical with respect to an axis passing through the center of socket S1 along up-down direction Dud, as a symmetric axis. As illustrated in FIG. 1, socket S1 includes outer shield 1, housing 2, plural (two) inner shields 3, and plural (eight) terminals 4. Each of outer shield 1 and inner shields 3 is an electrostatic shield. Outer shield 1 surrounds terminals 4. That is, outer shield 1 is disposed outside terminals 4. Inner shields 3 are arranged inside outer shield 1 Inner shields 3 are arranged inside housing 2.

Figure 2:
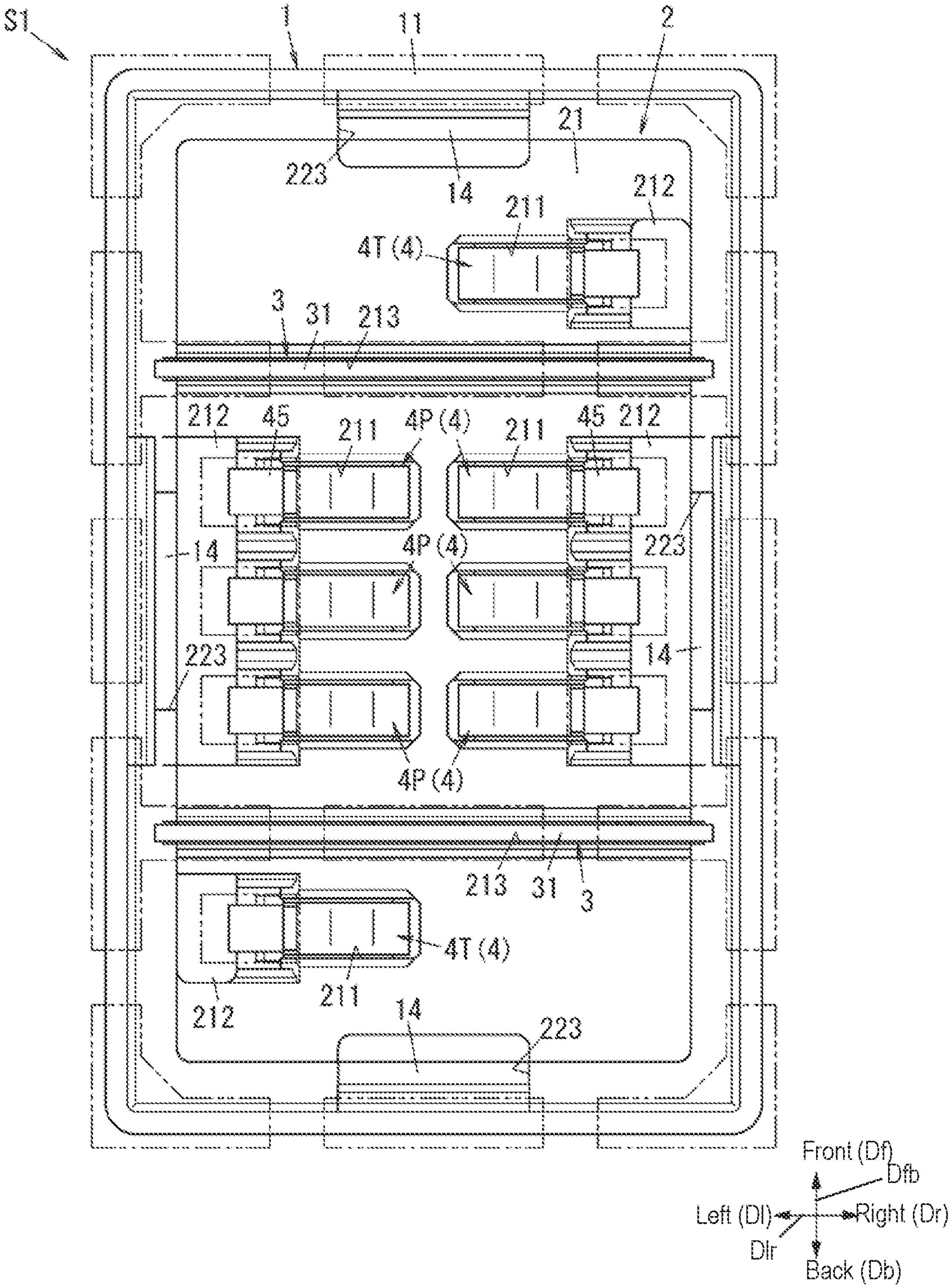
FIG. 2 is a bottom view of the socket.

Circuit board 150 (see FIG. 9) is mechanically and electrically connected to socket S1. In the exemplary embodiment, circuit board 150 is a double-sided board, but circuit board 150 may be a multi-layered board. Circuit board 150 includes substrate 160 (see FIG. 9) and conductors 170 and 180 (see FIG. 9). Substrate 160 is, for example, a semiconductor substrate or a glass substrate. Conductor 170 is a pattern of, for example, a copper foil provided on a surface of substrate 160. For example, conductor 170 is provided substantially on the entire surface of substrate 160 to which socket S1 is connected. Conductor 180 is, for example, solder. Conductor 180 is provided in a predetermined region (land) of conductor 170. Conductor 170 is electrically connected to outer shield 1, inner shields 3, and terminals 4 through conductor (solder) 180. Outer shield 1 and inner shields 3 are electrically connected to, e.g. a ground provided on circuit board 150. In FIG. 2, a region in which conductor (solder) 180 is provided is illustrated by a two-dot chain line.

(2.1.1) Housing of Socket

Figure 3:
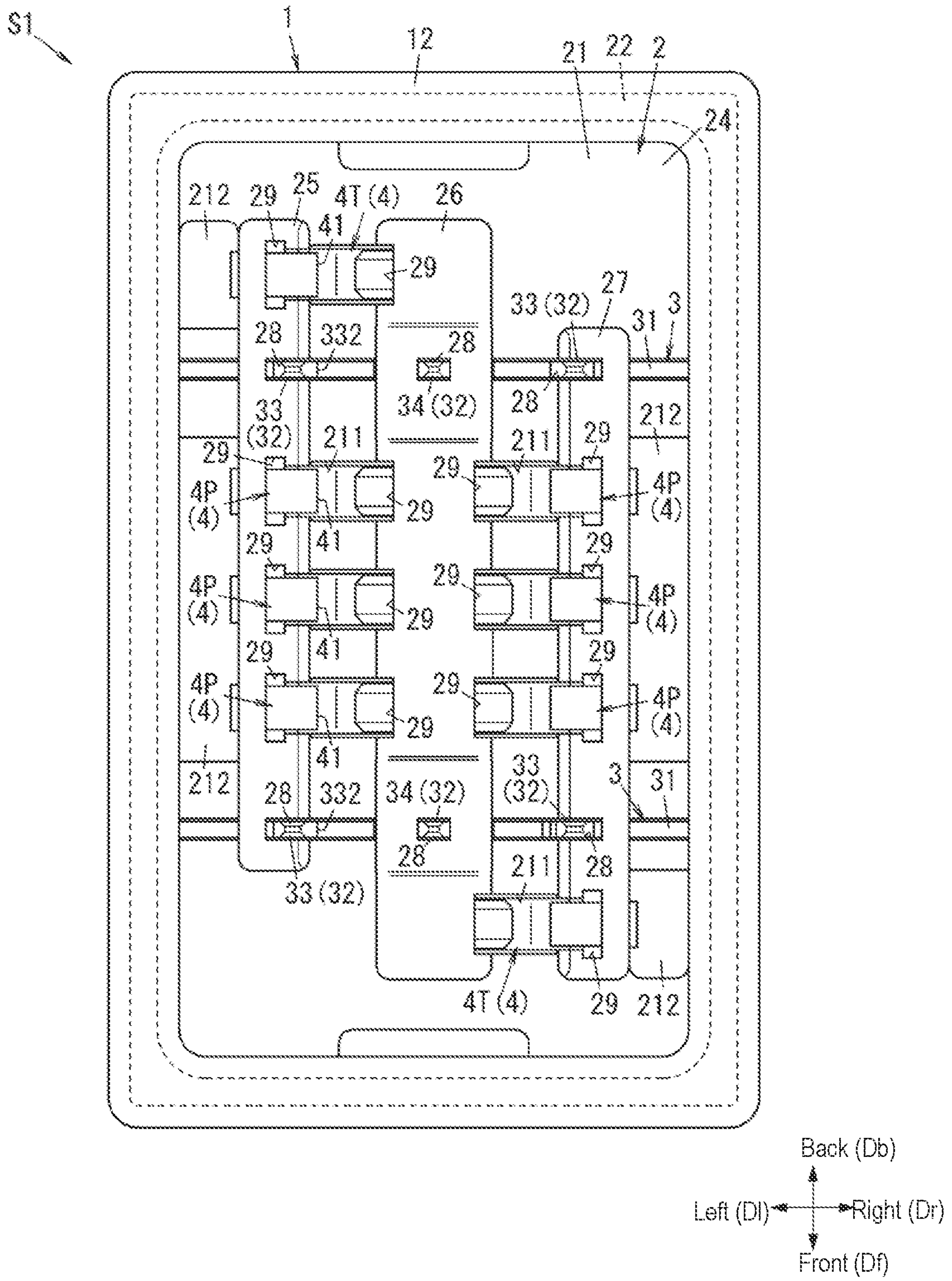
FIG. 3 is a plan view of the socket.

Housing 2 is made of a molded resin. Housing 2 has electrical insulating properties. As illustrated in FIGS. 1 to 3, housing 2 has bottom wall 21 and peripheral wall 22. Bottom wall 21 has a rectangular shape in which the length thereof in front-back direction Dfb is longer than the length thereof in left-right direction Dlr in a plan view. Peripheral wall 22 protrudes from the entire circumference of the outer circumferential portion of one surface (upper surface) of bottom wall 21 in a thickness direction of the bottom wall, i.e., in upward direction Du. Housing 2 has a rectangular parallelepiped shape which is flat to extend perpendicularly to up-down direction Dud, and has recess 24 (see FIG. 3) in the center of the upper surface which is a surface facing header H1 among both sides of the housing in up-down direction Dud. The recess is surrounded by peripheral wall 22.

Peripheral wall 22 has a tubular shape. Peripheral wall 22 surrounds plural terminals 4. Peripheral wall 22 extends continuously over the entire circumference of peripheral wall 22 in circumferential direction D22 (see FIG. 1). In other words, peripheral wall 22 has no break over the entire circumference of peripheral wall 22 in circumferential direction D22. As illustrated in FIG. 1, peripheral wall 22 includes two peripheral walls 221 and two peripheral walls 222. Two peripheral walls 221 are portions of peripheral wall 22, and extend substantially parallel to front-back direction Dfb. Two peripheral walls 221 face each other in left-right direction Dlr across recess 24. Two peripheral walls 222 are portions of peripheral wall 22, and extend substantially parallel to left-right direction Dlr. Two peripheral walls 222 face each other in front-back direction Dfb across recess 24. Each of two peripheral walls 222 connects the ends of two peripheral walls 221 to each other. That is, housing 2 has a shape in which one opening surface (lower surface) of peripheral wall 22 having a rectangular tubular shape with a quadrangular cross section is closed by bottom wall 21.

As illustrated in FIG. 3, housing 2 further includes wall portion 25, wall portion 26, and wall portion 27. Wall portion 25, wall portion 26, and wall portion 27 protrude from bottom wall 21 in upward direction Du. Wall portion 25, wall portion 26, and wall portion 27 are arranged in recess 24. That is, wall portion 25, wall portion 26, and wall portion 27 are surrounded by peripheral wall 22. Wall portion 25, wall portion 26, and wall portion 27 have rectangular parallelepiped shapes. When viewed in up-down direction Dud, each of wall portion 25, wall portion 26, and wall portion 27 is longer in front-back direction Dfb than in left-right direction Dlr. That is, wall portion 25, wall portion 26, and wall portion 27 are wall portions having a thickness in the direction along left-right direction Dlr. Wall portion 25, wall portion 26, and wall portion 27 are arranged in this order from the left to the right, that is, in rightward direction Dr.

Each of the wall portions (wall portion 25, wall portion 26, and wall portion 27) includes plural (two) accommodation portions 28. Extension 32 of inner shield 3 is accommodated in each of accommodation portions 28. Each of accommodation portions 28 is a through-hole provided in the wall portion. Accommodation portion 28 passes through the wall portion in up-down direction Dud. Accommodation portion 28 also passes through bottom wall 21 in up-down direction Dud. When viewed in up-down direction Dud, accommodation portions 28 provided in wall portion 25 and the wall portions 27 are recesses penetrating from the side surface (surface intersecting in left-right direction Dlr) of wall portion 25 (wall portion 27).

Each of the wall portions (wall portion 25, wall portion 26, and wall portion 27) includes plural terminal holders 29. Each of terminal holders 29 holds terminal 4. Each of terminal holders 29 is a through-hole provided in the wall portion. This through-hole passes through terminal holder 29 in up-down direction Dud. When viewed in up-down direction Dud, terminal holder 29 is a recess penetrating from the side surface (surface intersecting in left-right direction Dlr) of the wall portion. Two of terminal holders 29 correspond to one set. One set of two terminal holders 29 corresponding to each other are arranged in left-right direction Dlr. A portion of bottom wall 21 between two terminal holders 29 corresponding to each other is through-hole 211 into which terminal 4 is inserted.

Plural terminals 4 are fixed to housing 2 by press fitting. That is, Terminals 4 are held in housing 2 by being pushed into housing 2 in one direction (upward). In the exemplary embodiment, eight terminals 4 are fixed to housing 2. Eight terminals 4 are arranged in two rows. That is, four terminals 4 among eight terminals 4 form a first row, and the remaining four terminals 4 form a second row. Four terminals 4 in each row are arranged in front-back direction Dfb. Each of four terminals 4 forming the first row is held by terminal holder 29 of wall portion 25 and terminal holder 29 of wall portion 26. Each of four terminals 4 forming the second row is held by terminal holder 29 of wall portion 26 and terminal holder 29 of wall portion 27. That is, each of terminals 4 is disposed between the two wall portions and is supported from both sides of the each terminal by the two wall portions.

As illustrated in FIG. 2, bottom wall 21 has plural notches 212 provided therein. Notches 212 are provided at positions facing board connection portions 45 (described later) of terminals 4 when viewed in up-down direction Dud. Bottom wall 21 has plural (two) accommodation grooves 213 provided therein. Each of accommodation grooves 213 is a groove provided in the lower surface of bottom wall 21. Accommodation groove 213 is longer in left-right direction Dlr than in front-back direction Dfb. Accommodation groove 213 accommodates base 31 of inner shield 3 therein.

Peripheral wall 22 includes plural (four) insertion portions 223. Plural (four) insertion portions 223 are recesses penetrating from the side surfaces (inner surfaces) of two peripheral walls 221 and two peripheral walls 222. As described later, shield protrusion 14 which is a portion of outer shield 1 is inserted into each of plural (four) insertion portions 223.

(2.1.2) Outer Shield of Socket

Figure 4:
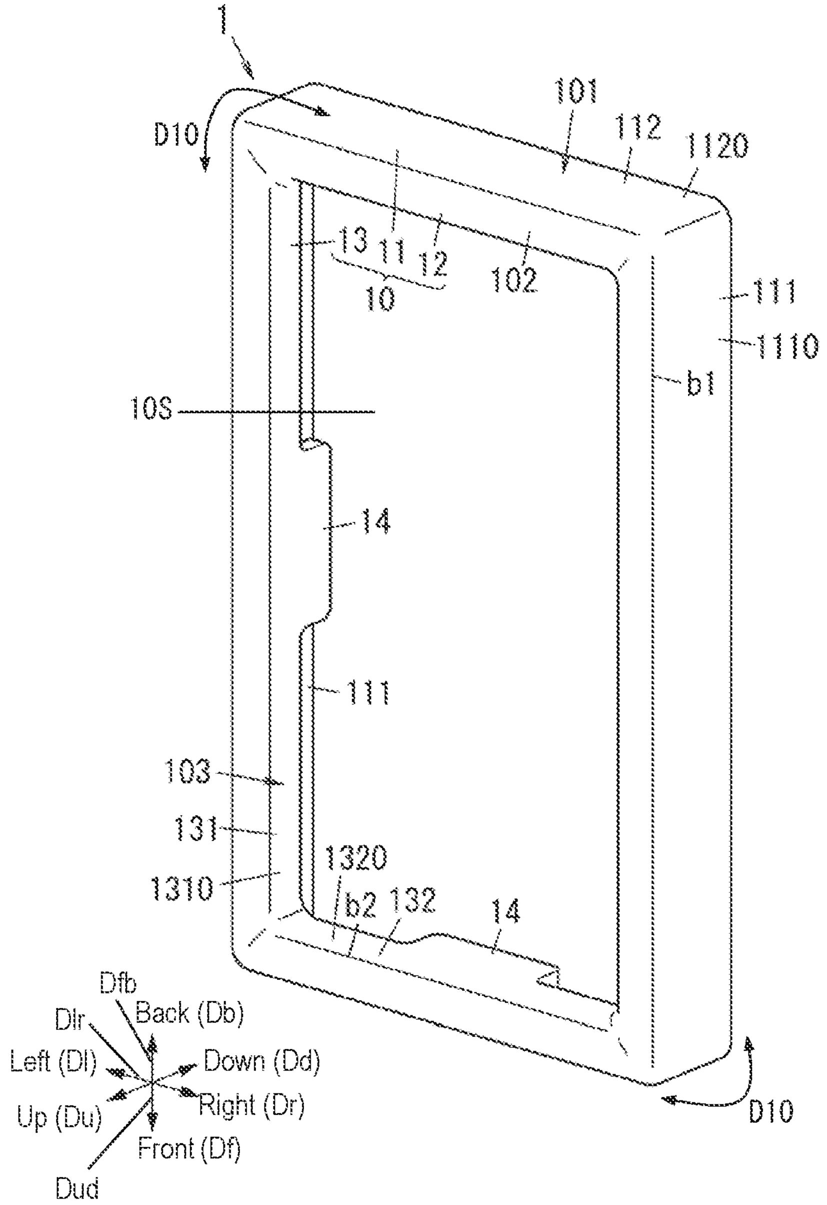
FIG. 4 is a perspective view of an outer shield of the socket.

Outer shield 1 surrounds terminals 4 and inner shields 3. Outer shield 1 contains metal as a main material or a material forming the surface, such as plating. Here, as an example, outer shield 1 is made of metal as main material. As illustrated in FIGS. 1 and 4, outer shield 1 includes tubular portion 10 and plural (four) shield protrusions 14. Tubular portion 10 includes outer peripheral wall 11, top wall 12, and inner peripheral wall 13.

Outer peripheral wall 11 has a rectangular tubular shape with a rectangular cross section. Outer peripheral wall 11 includes two outer peripheral walls 111 and two outer peripheral walls 112. Two outer peripheral walls 111 are portions of outer peripheral wall 11, and extend substantially in front-back direction Dfb. Two outer peripheral walls 111 face each other in left-right direction Dlr. Two outer peripheral walls 112 are portions of outer peripheral wall 11, and extend substantially in left-right direction Dlr. Two outer peripheral walls 112 face each other in front-back direction Dfb. Each of two outer peripheral walls 112 connects the ends of two outer peripheral walls 111 to each other. The lower end portions (lower surfaces) of outer peripheral wall 111 and outer peripheral wall 112 are parallel to a plane extending in left-right direction Dlr and front-back direction Dfb.

Top wall 12 has a rectangular frame shape when viewed in up-down direction Dud. Top wall 12 is connected to the upper end of outer peripheral wall 11 and extends toward inside outer peripheral wall 11 when viewed in up-down direction Dud.

Inner peripheral wall 13 is provided inside outer peripheral wall 11. Inner peripheral wall 13 has a rectangular tubular shape with a rectangular cross section. The upper end of outer peripheral wall 11 and the upper end of inner peripheral wall 13 are joined to each other by top wall 12.

Inner peripheral wall 13 includes two inner peripheral walls 131 and two inner peripheral walls 132. Two inner peripheral walls 131 are portions of inner peripheral wall 13, and extend substantially in front-back direction Dfb. Two inner peripheral walls 131 face each other in left-right direction Dlr. Two inner peripheral walls 132 are portions of inner peripheral wall 13, and extend substantially parallel to left-right direction Dlr. Two inner peripheral walls 132 face each other in front-back direction Dfb. Each of two inner peripheral walls 132 connects the ends of two inner peripheral walls 131 to each other.

Outer peripheral wall 11, top wall 12, and inner peripheral wall 13 constitute tubular portion 10 having both ends which open in up-down direction Dud. The outer circumferential surface of outer peripheral wall 11 corresponds to outer circumferential surface 101 of tubular portion 10. The inner circumferential surface of inner peripheral wall 13 corresponds to inner circumferential surface 103 of tubular portion 10. Outer shield 1 has distal end surface 102. Distal end surface 102 is provided at one end (upper end) among both the ends of tubular portion 10 in up-down direction Dud. The one end is on the mating connector side when the connector (socket S1) and the mating connector (header H1) are transitioned from the disconnected state to the connected state. Distal end surface 102 has a loop shape extending along the inner edge of tubular portion 10. The upper surface of top wall 12 corresponds to distal end surface 102. The inner edge of distal end surface 102 corresponds to the inner edge of tubular portion 10 at the upper end of tubular portion 10.

Figure 9:
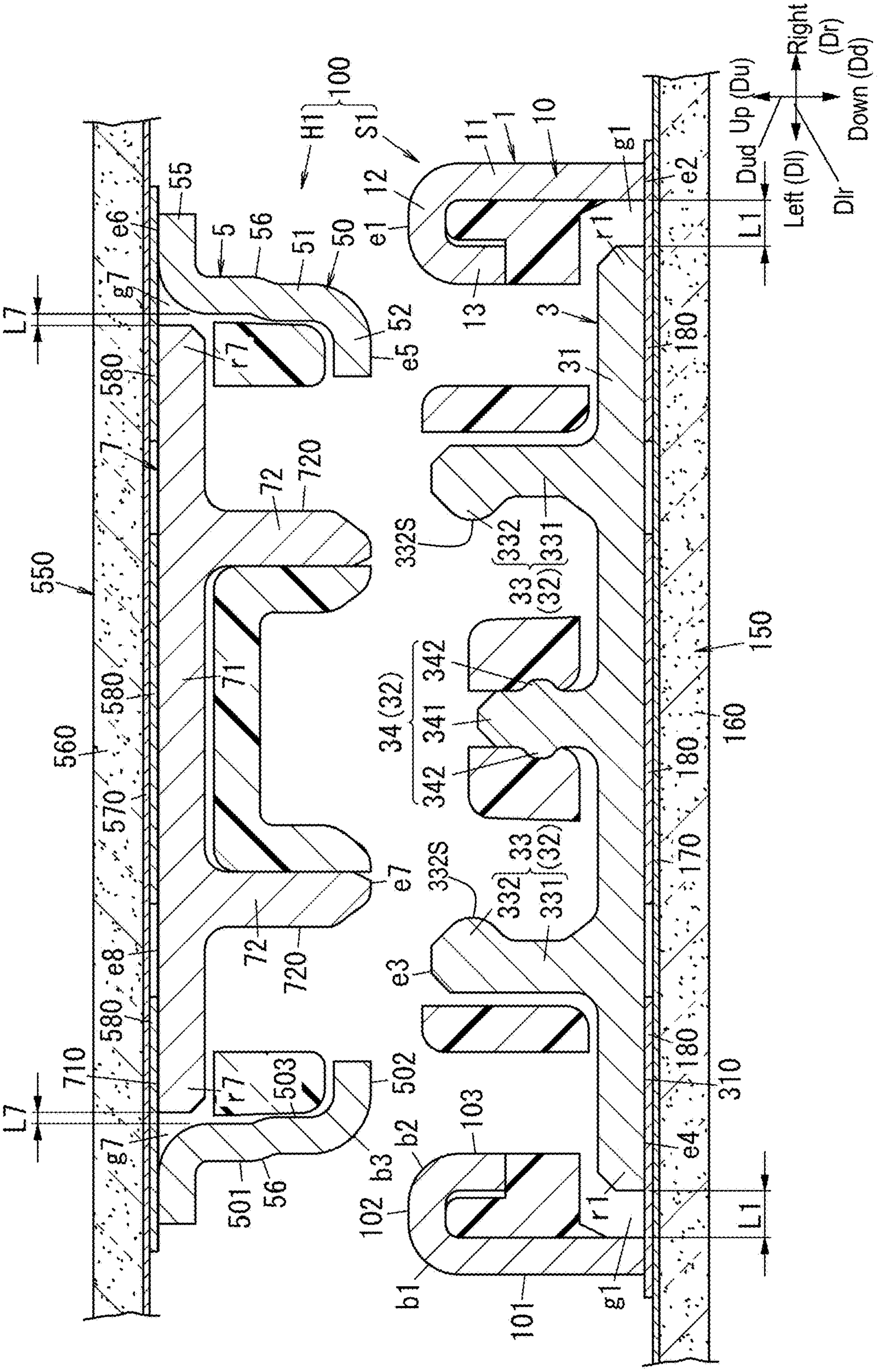
FIG. 9 is a sectional view of the connector where the socket is separated the header, illustrating including respective inner shields of the socket and the header.

Boundary b1 between distal end surface 102 and outer circumferential surface 101 is a surface arcuate when viewed in front-back direction Dfb (see FIG. 9). Boundary b2 between distal end surface 102 and inner circumferential surface 103 is a surface arcuate when viewed in front-back direction Dfb (see FIG. 9). Distal end surface 102 is defined as a region of the outer surface of tubular portion 10 forming an acute angle with respect to up-down direction Dud is equal to or larger than 0 degrees and smaller than degrees. The outer surface forming an acute angle equal to or larger than degrees is defined as outer circumferential surface 101. The inner surface having an acute angle which is equal to or larger than 45 degrees is defined as inner circumferential surface 103. Tubular portion 10 surrounds hollow space 10S. Boundary b1 includes a portion of distal end surface 102 and a portion of outer circumferential surface 101 over the entire circumference in circumferential direction D10 (see FIG. 4) surrounding hollow space 10S of tubular portion 10. Boundary b2 includes a portion of distal end surface 102 and a portion of inner circumferential surface 103 over the entire circumference of tubular portion 10 in circumferential direction D10.

Plural (four) shield protrusions 14 are provided corresponding to two inner peripheral walls 131 and two inner peripheral walls 132, respectively. Each of the shield protrusions 14 protrudes downward from corresponding inner peripheral wall 131 or inner peripheral wall 132. Each of plural (four) shield protrusions 14 corresponds to respective one of plural (four) insertion portions 223 (see FIG. 2) provided in housing 2. Each of shield protrusions 14 is inserted into corresponding one of insertion portions 223.

Outer shield 1 is insert-molded with housing 2. More specifically, outer shield 1 is insert-molded with housing 2 so that peripheral wall 22 of housing 2 is inserted between outer peripheral wall 11 and inner peripheral wall 13 of outer shield 1.

The entire surface of outer shield 1 is seamlessly formed. Outer shield 1 is formed, for example, by drawing. Thus, the entire surface of outer shield 1 is seamlessly formed. In the exemplary embodiment, at least outer circumferential surface 101 and inner circumferential surface 103 among the surfaces of outer shield 1 are seamless over the entirety of tubular portion 10 in circumferential direction D10 (that is, there are no seams or breaks). In the exemplary embodiment, distal end surface 102 is seamless over the entirety of tubular portion 10 in circumferential direction D10.

For example, regarding outer circumferential surface 101, as illustrated in FIG. 4, outer circumferential surface 101 includes outer surface 1110 of each of two outer peripheral walls 111 and outer surface 1120 of each of two outer peripheral walls 112. Each of outer surface 1110 and outer surface 1120 is seamless. Outer surface 1110 and outer surface 1120 which have different normal directions are seamlessly connected to each other. Outer circumferential surface 101 is thus seamless over the entirety of tubular portion 10 in circumferential direction D10.

For example, regarding inner circumferential surface 103, as illustrated in FIG. 4, inner circumferential surface 103 includes outer surface 1310 of each of two inner peripheral walls 131 and outer surface 1320 of each of two inner peripheral walls 132. Each of outer surface 1310 and outer surface 1320 is seamless. Outer surface 1310 and outer surface 1320 which have different normal directions are seamlessly connected to each other. Inner circumferential surface 103 is thus seamless over the entirety of tubular portion 10 in circumferential direction D10.

At least one (both in the exemplary embodiment) of boundary b1 between distal end surface 102 and outer circumferential surface 101 and boundary b2 between distal end surface 102 and inner circumferential surface 103 is seamless over the entire circumference of tubular portion 10 in circumferential direction D10.

For example, at the upper right (corner portion of outer shield 1) in FIG. 4, outer surface 1110 of outer peripheral wall 111, outer surface 1120 of outer peripheral wall 112, and distal end surface 102 are seamlessly connected. That is, outer surface 1110, outer surface 1120, and distal end surface 102 which have different normal directions are seamlessly connected to one another. On the right in FIG. 4, outer surface 1110 and distal end surface 102 which have different normal directions are seamlessly connected to each other. At the upper portion in FIG. 4, outer surface 1120 and distal end surface 102 which have different normal directions are seamlessly connected to each other. Boundary b1 is thus seamless over the entirety of tubular portion 10 in circumferential direction D10.

For example, at the lower left (corner portion of outer shield 1) in FIG. 4, outer surface 1310 of inner peripheral wall 131, outer surface 1320 of inner peripheral wall 132, and distal end surface 102 are seamlessly connected to one another. That is, outer surface 1310, outer surface 1320, and distal end surface 102 which have different normal directions are seamlessly connected to one another. On the left in FIG. 4, outer surface 1310 and distal end surface 102 which have different normal directions are seamlessly connected to each other. At the lower portion in FIG. 4, outer surface 1320 and distal end surface 102 which have different normal directions are seamlessly connected to each other. Boundary b2 is thus seamless over the entirety of tubular portion 10 in circumferential direction D10.

(2.1.3) Inner Shield of Socket

In the exemplary embodiment, two inner shields 3 have the same shape. Inner shield 3 contains metal as a main material or a material forming the surface, such as plating. Here, inner shield 3 is made of metal as main material. As illustrated in FIGS. 1 and 9, inner shield 3 includes base 31 and plural (three) extensions 32 (two extensions 33 and one extension 34).

Base 31 has a length in along left-right direction Dlr. Base 31 has a plate shape. When viewed in a thickness direction (front-back direction Dfb) of base 31, base 31 is longer in left-right direction Dlr than in up-down direction Dud. Base 31 is accommodated in accommodation groove 213 provided in bottom wall 21 of housing 2.

As illustrated in FIG. 9, plural extensions 32 protrude upward from base 31. That is, extensions 32 protrude in up-down direction Dud to be directed to the mating connector side when the connector (socket S1) and the mating connector (here, header H1) are transitioned from the disconnected state to the connected state. Extensions 32 have plate shapes. When viewed in a thickness direction (front-back direction Dfb) of each of extensions 32, each of extensions 32 is longer in up-down direction Dud than in left-right direction Dlr. The thickness direction of extension 32 may be left-right direction Dlr.

Extension 33 includes extension body 331 and contacting portion 332. Extension body 331 protrudes from base 31. Contacting portion 332 is configured to contact the mating inner shield (inner shield 7) of the mating connector (header H1). Contacting portion 332 protrudes from extension body 331 in a longitudinal direction (direction Dl or direction Dr). Contacting portion 332 is provided on surface 332S (here, left surface or right surface) of extension 33 (extension body 331) in the longitudinal direction of extension 33. That is, contacting portion 332 protrudes from extension body 331 in left-right direction Dlr.

Contacting portions 332 of two extensions 33 face each other in left-right direction Dlr. Contacting portion 332 is configured to contact contacting portion 720 of inner shield 7 of header H1 while socket S1 is connected to header H1 (see FIG. 10). Thus, each of two inner shields 3 is electrically connected to corresponding one of inner shields 7 of two inner shields 7 of header H1. Specifically, two extensions 72 of inner shield 7 are inserted between two extensions 33 of inner shield 3. At this moment, two extensions 72 are pressed against two extensions 33 due to elasticity of two extensions 72 and two extensions 33.

Extension 34 includes extension body 341 and plural (two) holding protrusions 342. Extension body 341 protrudes from base 31. Two holding protrusions 342 protrude from extension body 341. Two holding protrusions 342 are provided on the left end and the right end of extension body 341. That is, one of two holding protrusions 342 protrudes from extension body 341 in the left direction Dl, and the other protrudes from extension body 341 in the right direction Dr.

Socket S1 includes three extensions 32 on each of two inner shields 3. That is, socket S1 includes six extensions 32 in total. Each of six accommodation portions 28 (see FIG. 3) provided in housing 2 corresponds to respective one of six extensions 32. Each of extensions 32 is accommodated in corresponding accommodation portion 28. More specifically, extension 33 is accommodated in accommodation portion 28 of wall portion 25 and wall portion 27. Extension 34 is accommodated in accommodation portion 28 of wall portion 26. In extension 34, the width including two holding protrusions 342 in left-right direction Dlr is slightly larger than the width of accommodation portion 28 in left-right direction Dlr. Inner shield 3 is fixed to housing 2 by press fitting. That is, inner shield 3 is held in housing 2 by being pushed into housing 2 in one direction (upward). Inner shield 3 is held in housing 2 while two holding protrusions 342 are sandwiched by the inner surfaces of accommodation portion 28 in between.

The accommodation space of each of two extensions 33 in the shield holder (accommodation portion 28) is larger than each of two extensions 33. That is, a margin is provided in the alignment between each of two extensions 33 and the inner surface of accommodation portion 28. This function of holding inner shield 3 in housing 2 is realized by at least extension 34. That is, inner shield 3 is held in housing 2 by press fitting at least extension 34 into accommodation portion 28. Plural extensions 32 include extension 33 including contacting portion 332 contacting inner shield 7 of the mating connector (here, header H1) and extension 34 held in the shield holder (accommodation portion 28). Extension 34 may also include a contacting portion configured to contact inner shield 7 of the mating connector (here, header H1).

As illustrated in FIG. 9, base 31 of inner shield 3 is located at the lower end of socket S1. Inner shield 3 is surrounded by outer shield 1. Inner shield 3 includes two tip regions r1 facing outer shield 1. Two tip regions r1 are provided at both ends (left end and right end) of base 31 in a longitudinal direction of the base.

Outer shield 1 has end e1 and end e2. End e1 is an end (upper end) that is on the mating connector side when the connector (here, socket S1) and the mating connector (here, header H1) are transitioned from the disconnected state to the connected state. End e2 is an end (lower end) opposite to end e1. End e2 is a region of outer shield 1 extending over the entire circumference of tubular portion 10 in circumferential direction D10. Outer shield 1 faces two tip regions r1 in the region of outer shield 1 including end e2.

Outer shield 1 faces at least one of two tip regions r1 with gap g1 in between in the region of outer shield 1 including end e2. As illustrated in FIG. 9, conductors 170 and 180 of circuit board 150 are electrically connected to outer shield 1. Conductors 170 and 180 are provided to bridge end e2 of outer shield 1 to two tip regions r1 of inner shield 3, respectively. That is, outer shield 1 is electrically connected to inner shield 3 through conductors 170 and 180. In a state where circuit board 150 is not provided, outer shield 1 is electrically insulated from at least one (both in the exemplary embodiment) of two tip regions r1 via gap g1. Shortest distance L1 between outer shield 1 and at least one of two tip regions r1 in gap g1 is equal to or greater than 0.01 mm and equal to or less than 0.1 mm.

Inner shield 3 has end e3 and end e4. End e3 is an end (upper end) that is on the mating connector side when the connector (here, socket S1) and the mating connector (here, header H1) are transitioned from the disconnected state to the connected state. End e4 is an end (lower end) opposite to end e3. Inner shield 3 has connection surface 310 (lower surface) at end e4. Connection surface 310 is configured to be electrically connected to circuit board 150. Connection surface 310 is flat and continuously extends over two tip regions r1. More specifically, connection surface 310 is a rectangular flat surface connecting two tip regions r1 to each other.

(2.1.4) Terminal of Socket (2.1.4.1) Arrangement

As illustrated in FIGS. 2 and 3, plural (eight) terminals 4 include plural (six) low-frequency terminals 4P and plural (two) high-frequency terminals 4T. Each of terminals 4 is inserted into through-hole 211 of bottom wall 21 of housing 2 and is held by terminal holder 29.

Two high-frequency terminals 4T are arranged on both sides of at least one inner shield 3. In other words, at least one inner shield 3 is disposed between two high-frequency terminals 4T. This configuration reduces noise propagation between two high-frequency terminals 4T.

More specifically, two high-frequency terminals 4T are arranged on both sides of at least one inner shield 3 in front-back direction Dfb, that is, arranged on the front side and the back side of inner shield 3. Focusing on one of two inner shields 3 in FIG. 2, one high-frequency terminal 4T is disposed in front of inner shield 3, that is, in forward direction Df from inner shield 3. In addition, the remaining one high-frequency terminal 4T is disposed behind inner shield 3, that is, in backward direction Db from inner shield 3. Two inner shields 3 are arranged between two high-frequency terminals 4T. A longitudinal direction (left-right direction Dlr) of inner shield 3 is a direction intersecting with a direction (substantially front-back direction Dfb) in which two high-frequency terminals 4T are arranged.

Six low-frequency terminals 4P are arranged between two inner shields 3. That is, one of two inner shields 3 separates a space in which one of two high-frequency terminals 4T is disposed from a space in which six low-frequency terminals 4P are arranged. The other of two inner shields 3 separates a space in which the other of two high-frequency terminals 4T is disposed from the space in which six low-frequency terminals 4P are arranged. Six low-frequency terminals 4P are arranged in two rows each containing three thereof in front-back direction Dfb.

Three low-frequency terminals 4P in each row are arranged at equal pitches in front-back direction Dfb. High-frequency terminals 4T are arranged in front of or behind low-frequency terminal 4P at the end of each row, that is, in forward direction Df or backward direction Db from low-frequency terminal 4P at the end of each row. The pitch between low-frequency terminal 4P and high-frequency terminal 4T is an integer multiple (twice in the exemplary embodiment) of the pitch between three low-frequency terminals 4P. This arrangement allows six low-frequency terminals 4P and two high-frequency terminals 4T to be easily assembled into housing 2.

In the exemplary embodiment, the pitch between low-frequency terminal 4P and high-frequency terminal 4T is longer than the pitch between three low-frequency terminals 4P. This arrangement secures a space for arranging inner shield 3 between low-frequency terminal 4P and high-frequency terminal 4T.

A space in which plural low-frequency terminals 4P are arranged is provided between two high-frequency terminals 4T. This configuration secures the distance between two high-frequency terminals 4T, and accordingly reduces noise propagation between two high-frequency terminals 4T. Two high-frequency terminals 4T are arranged at diagonal positions inside peripheral wall 22 of housing 2, accordingly increasing the distance between two high-frequency terminals 4T.

Two high-frequency terminals 4T are electrically connected to a signal line made of conductor 170 patterned on circuit board 150. At least one of six low-frequency terminals 4P is electrically connected to a power line made of conductor 170 patterned on circuit board 150. A signal having a higher frequency is transmitted through two high-frequency terminals 4T than the frequency in six low-frequency terminals 4P. The frequency of the signal transmitted by two high-frequency terminals 4T ranges, for example, from about 5 to 50 GHz.

At least one of six low-frequency terminals 4P may be electrically connected to inner shield 3, thus having a potential equal to the potential of inner shield 3. Specifically, the potential of the at least one of six low-frequency terminals 4P and the potential of inner shield 3 are a ground potential. At least one of six low-frequency terminals 4P may be electrically connected to inner shield 3, for example, through conductors 170 and 180 of circuit board 150. At least one of six low-frequency terminals 4P may be electrically connected to inner shield 3 not through circuit board 150.

(2.1.4.2) Shape

Terminals 4 have the same shape. Terminals 4 are formed, for example, by punching and bending a metal plate. As illustrated in FIG. 11, each of terminals 4 includes contact portion 41, base 42, joining portion 43, protruding portion 44, board connection portion 45, and contact portion 46.

Board connection portion 45 is electrically connected to, for example, conductor 180 (solder) of circuit board 150. That is, board connection portion is bonded to circuit board 150 by a connecting method, such as soldering. Thus, terminal 4 is electrically and mechanically connected to circuit board 150. As illustrated in FIG. 2, board connection portion 45 is surrounded by outer shield 1 when viewed in up-down direction Dud. At least a portion of board connection portion 45 and at least a portion of outer shield 1 are located on one plane perpendicular to up-down direction Dud.

Joining portion 43 has a U-shape opening in downward direction Dd. Joining portion 43 joins the upper end portion of base 42 to the upper end portion of contact portion 41. The lower end portion of base 42 is connected to board connection portion 45.

Protruding portion 44 has a U-shape opening in upward direction Du. Protruding portion 44 connects the lower end portion of contact portion 41 to contact portion 46. Contact portion 41 faces contact portion 46 in left-right direction Dlr. In the exemplary embodiment, at least joining portion 43 and protruding portion 44 of terminal 4 have elasticity.

While terminal 4 is held in housing 2, at least respective portions of contact portion 41 and contact portion 46 is exposed when viewed from above. Contact portion 41 and contact portion 46 contact corresponding terminals 8 among plurality of terminals 8 (mating terminals) of header H1 (mating connector) to be electrically connected to terminal 8 (see FIG. 12). Specifically, contact portion 81 and contact portion 84 of terminal 8 are inserted between contact portion 41 and contact portion 46. At this moment, contact portion 41 and contact portion 46 are pressed against terminal 8 by the elasticity of protruding portion 44.

Terminal 4 further includes force-sensing portion 47. Force-sensing portion 47 generates a click feeling when terminal 4 contacts terminal 8 (mating terminal). Force-sensing portion 47 is a protrusion that protrudes from contact portion 41. When force-sensing portion 85 (protrusion) of terminal 8 moves over force-sensing portion 47, the click feeling is generated. Specifically, if force-sensing portion 85 moves downward and over force-sensing portion 47, the magnitude of a force acting between terminal 4 and terminal 8 decreases. Therefore, a worker who connects terminal 4 to terminal 8 senses the decrease in the magnitude of the force by the click feeling. The worker recognizes the progress of the connection between socket S1 and header H1 by sensing the click feeling. The connection between socket S1 and header H1 and the connection between terminal 4 and terminal 8 which accompanies the connection between socket S1 and header H1 are not necessarily performed manually, but by a machine.

When terminal 4 is connected to terminal 8, contact portion 46 is inserted into dent 840 of terminal 8. When terminal 4 and terminal 8 are transitioned from the connected state to the disconnected state, a certain amount or larger of force is required to cause force-sensing portion 85 to move upward and over force-sensing portion 47 and to remove contact portion 46 from dent 840. As described above, a combination of force-sensing portion 85 and force-sensing portion 47 and a combination of contact portion 46 and dent 840 constitute lock mechanisms maintaining the connected state between socket S1 and header H1.

As illustrated in FIG. 3, contacting portion 332 of inner shield 3 and contact portion 41 of at least one of terminals 4 are arranged in front-back direction Dfb.

(2.1.5) Circuit Board on Socket Side

Socket S1 is electrically connected to conductor 180 (solder) on circuit board 150. In FIG. 2, a region in which conductor 180 is provided on the lower surface of socket S1 is indicated by a two-dot chain line. Some of conductors 180 are provided on the lower surface of outer shield 1 along circumferential direction D10 of outer shield 1. Here, conductors 180 are provided on the lower surface of outer shield 1 in each of plural regions spaced from each other along circumferential direction D10 of outer shield 1. Conductors 180 may continuously extend on the lower surface of outer shield 1 over the entire circumference of outer shield 1 along circumferential direction D10. That is, outer shield 1 may continuously contact conductors 180 over the entire circumference of circumferential direction D10.

Some of conductors 180 are provided to bridge outer shield 1 to each of inner shields 3. Some of conductors 180 are provided on the lower surface of each of inner shields 3 in the longitudinal direction of inner shield 3. Here, conductors 180 are provided on the lower surface of each of inner shields 3 in each of plural (three) regions spaced from each other along the longitudinal direction of inner shield 3. Conductors 180 may continuously extend on the lower surface of each of inner shields 3 over the entire longitudinal direction of inner shield 3. That is, inner shield 3 may continuously contact conductors 180 over the entire longitudinal direction of the inner shield.

Some of conductors 180 are electrically connected to outer shield 1 and each of inner shields 3 as described above, and are electrically connected to conductor 170 having a ground potential among conductors 170 of circuit board 150. That is, outer shield 1 and inner shields 3 have the ground potential. Most of the surface of substrate 160 on the side to which socket S1 is connected is preferably occupied by conductor 170 having the ground potential. That is, a so-called ground plane is preferably provided on circuit board 150, thereby improving a shielding effect.

Some of conductors 180 are electrically connected to board connection portions 45 of terminals 4. Terminal 4 is electrically connected to a circuit through conductor 170 (wiring pattern) of circuit board 150. For example, plural high-frequency terminals 4T are electrically connected to a circuit that processes a signal. For example, at least some of low-frequency terminals 4P are electrically connected to wirings for transmitting a signal having a frequency lower than the frequency of a signal transmitted by high-frequency terminal 4T, or to a power supply circuit or the ground.

(2.1.6) Electrically-closed Loop of Socket

Figure 13:
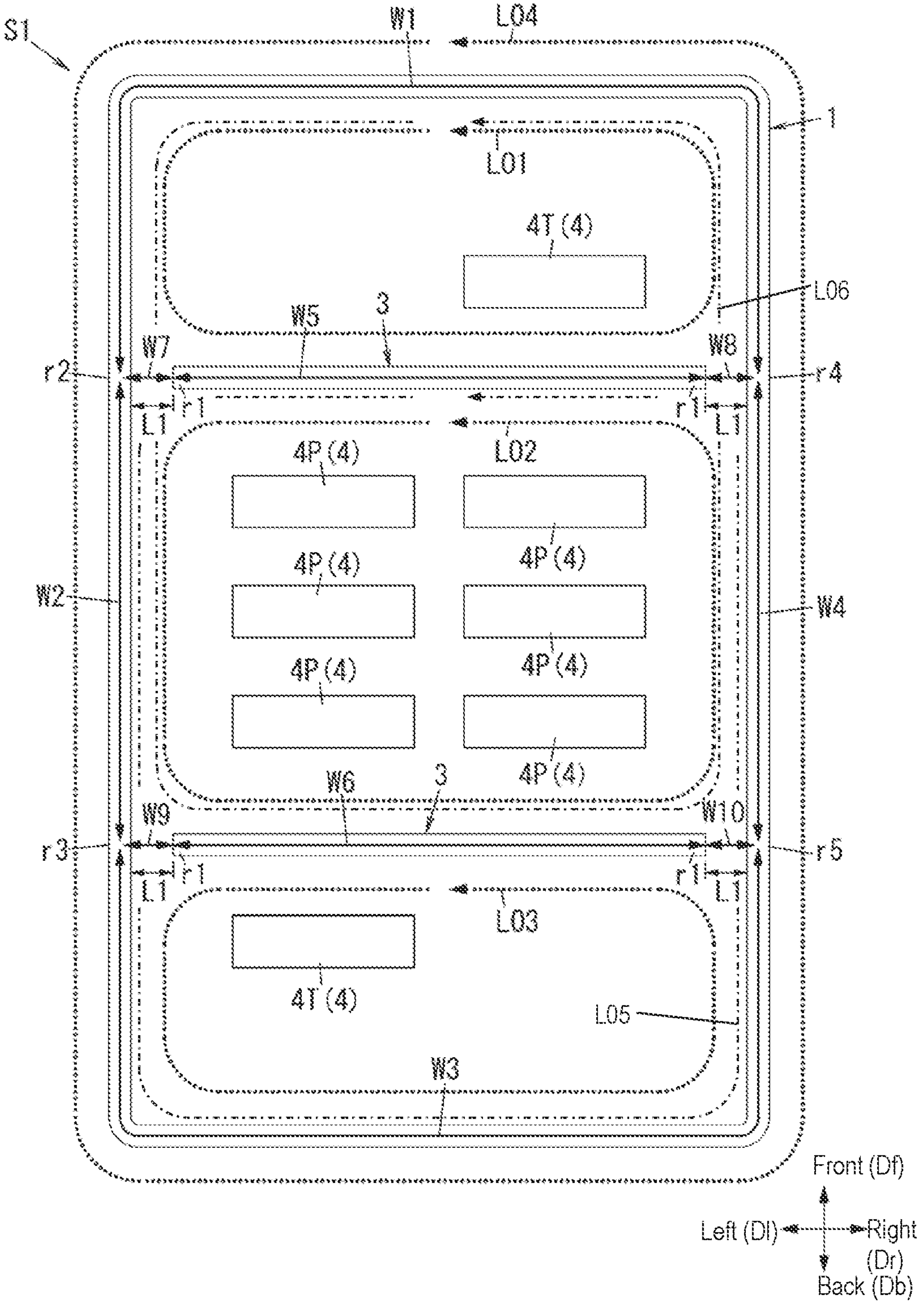
FIG. 13 is a bottom view of the connector schematically illustrating the socket.

FIG. 13 schematically illustrates the arrangement of outer shield 1, plural (two) inner shields 3, and plural (eight) terminals 4 when viewed from below.

In socket S1, at least plural (three) electrically-closed loops LO1, LO2, and LO3 described below are formed. Each of electrically-closed loops LO1, LO2, and LO3 includes at least outer shield 1 and one or two inner shields 3 among outer shield 1, two inner shields 3, and virtual paths W7, W8, W9, and W10. That is, each of electrically-closed loops LO1, LO2, and LO3 necessarily includes a path completed in outer shield 1 and a path completed in one inner shield 3 or each of two inner shields 3, and optionally includes at least one of virtual paths W7, W8, W9, and W10. Each of two virtual paths W7 and W8 (or W9 and W10) connects outer shield 1 to respective one of two tip regions r1 of inner shield 3 by shortest distance L1. Each of electrically-closed loops LO1, LO2, and LO3 surrounds at least one terminal 4. Each of electrically-closed loops LO1, LO2, and LO3 does not surround other electrically-closed loops. The other electrically-closed loops include at least outer shield 1 and one or two inner shields 3 among the outer shield 1, two inner shields 3, and virtual paths W7, W8, W9, and W10. Electrically-closed loop LO1 does not surround electrically-closed loops LO2 and LO3. Electrically-closed loop LO2 does not surround electrically-closed loops LO1 and LO3. Electrically-closed loop LO3 does not surround electrically-closed loops LO1 and LO2.

In the present disclosure, when one electrically-closed loop (referred to as a first closed loop below) surrounds another electrically-closed loop (referred to as a second closed loop below), a portion of the first closed loop may overlap a portion of the second closed loop.

The longest loop length among the loop lengths of electrically-closed loops LO1, LO2, and LO3 is shorter than the wavelength of the maximum frequency of a transmission signal flowing through terminal 4. This configuration reduces resonance of a transmission signal. Here, the maximum frequency refers to the maximum frequency of the transmission signal flowing through high-frequency terminal 4T. That is, in the exemplary embodiment, the maximum frequency is determined in accordance with the specifications of high-frequency terminal 4T.

Paths W7 and W8, inner shield 3, and paths W2, W3, and W3 along outer shield 1 constitute electrically-closed loop LO5. Paths W9 and W10, inner shield 3, and paths W2, W1, and W4 along outer shield 1 constitute electrically-closed loop LO6. Thus, outer shield 1, inner shield 3, and two of virtual paths W7 to W10 constitute plural electrically-closed loops LO1, LO2, LO3, LO5, and LO6 each passing through outer shield 1, inner shield 3, and two of virtual paths W7 to W10 and include outer shield 1 and inner shield 3.

Each of electrically-closed loops LO1, LO2, LO3, LO5, and LO6 surrounds terminal 4. Electrically-closed loop LO5 out of plural electrically-closed loops LO1, LO2, LO3, LO5, and LO6 surrounds electrically-closed loops LO2 and LO2 other than electrically-closed loop LO5 per se. Electrically-closed loop LO6 out of plural electrically-closed loops LO1, LO2, LO3, LO5, and LO6 surrounds electrically-closed loops LO1 and LO2 other than electrically-closed loop LO6 per se. Each of one or more particular electrically-closed loops LO1, LO2, and LO3 out of plural electrically-closed loops LO1, LO2, LO3, LO5, and LO6 does not surround any electrically-closed loop out of plural electrically-closed loops LO1, LO2, LO3, LO5, and LO6 other than the each of one or more particular electrically-closed loops LO1, LO2, and LO3 per se. The longest loop length of one or more particular electrically-closed loops LO1, LO2, and LO3 is shorter than the wavelength of the maximum frequency of a transmission signal flowing through terminal 4.

In the case that the connector includes a single inner shield, two virtual paths are formed at both ends of the single inner shield in total. The two virtual paths, the inner shield, and the outer shield constitute plural electrically-closed loops.

In the connector as disclosed in Japanese Patent Laid-Open Publication No. 2013-182808, resonance of the transmission signal transmitted by the connector may occur.

In contrast, the connector in the exemplary embodiment reduces the resonance of the transmission signal flowing through terminal 4.

Upon not limiting to a plane perpendicular to up-down direction Dud, electrically-closed loops other than electrically-closed loops LO1, LO2, and LO3 are also formed in socket S1. However, any of these electrically-closed loops has a loop length which is shorter than the loop lengths of electrically-closed loops LO1, LO2, and LO3, hence not being described here.

Paths W1 to W10 constituting electrically-closed loops LO1, LO2, and LO3 will be described below.

Two inner shields 3 are arranged on the front and back parts in socket S1. Region r2 and region r3 are provided on the left side surface of outer shield 1. Region r2 faces tip region r1 on the left side of the front inner shield 3. Region r3 faces tip region r1 on the left side of back inner shield 3. Region r4 and region r5 are provided on the right side surface of outer shield 1. Region r4 faces tip region r1 on the right side of the front inner shield 3. Region r5 faces tip region r1 on the right side of the back inner shield 3.

Path W1 is included in the front region of outer shield 1 and connects region r4 to region r2 along outer shield 1. Path W2 connects region r2 to region r3 along the left side surface of outer shield 1.

Path W3 is included in the back region of outer shield 1 and connects region r3 to region r5 along outer shield 1. Path W4 connects region r5 to region r4 along the right side surface of outer shield 1.

Path W5 connects two tip regions r1 of upper inner shield 3 to each other. Path W6 connects two tip regions r1 of lower inner shield 3 to each other.

Path W7 connects region r2 of outer shield 1 to tip region r1 on the left side of front inner shield 3 by shortest distance L1. Path W8 connects region r4 of outer shield 1 to tip region r1 on the right side of front inner shield 3 by shortest distance L1.

Path W9 connects region r3 of outer shield 1 to tip region r1 on the left side of back inner shield 3 by shortest distance L1. Path W10 connects region r5 of outer shield 1 to tip region r1 on the right side of back inner shield 3 by shortest distance L1.

Electrically-closed loop LO1 is constituted by paths W1, W7, W5, and W8. Electrically-closed loop LO2 is constituted by paths W2, W9, W6, W10, W4, W8, W5, and W7. Electrically-closed loop LO3 is constituted by paths W3, W10, W6, and W9.

As described above, in the present disclosure, in the case that an electrically-closed loop (first closed loop) surrounds another electrically-closed loop (second closed loop), the portion of the first closed loop may overlap the portion of the second closed loops. For example, in FIG. 13, a first closed loop constituted by paths W4, W1, W2, W9, W6, and W10 overlaps electrically-closed loop LO1 as a second closed loop in path W1. The first closed loop surrounds the second closed loop.

In the exemplary embodiment, the loop length of electrically-closed loop LO2 is the longest among the loop lengths of electrically-closed loops LO1, LO2, and LO3. The longest loop length ranges, e.g. from about 6 mm to 7 mm.

In the case that maximum frequency fMAX of a transmission signal flowing through terminal 4 is 10 GHz (1010 Hz), wavelength λ of maximum frequency fMAX of the transmission signal is expressed as $\lambda=3\times10^8/\text{fMAX}=0.03$ [m]=30 [mm]. The longest loop length ranging from 6 to 7 [mm] satisfies the condition that the longest loop length is shorter than wavelength λ of maximum frequency fMAX.

Outer shield 1 constitutes electrically-closed loop LO4 surrounding terminal 4 without inner shield 3. Electrically-closed loop LO4 is constituted by paths W1, W2, W3, and W4. That is, tubular portion 10 (see FIG. 4) of outer shield 1 continuously extending along circumferential direction D10 constitutes electrically-closed loop LO4. Electrically-closed loop LO4 surrounds electrically-closed loops LO1, LO2, and LO3.

Since outer shield 1 has no gap therein along circumferential direction D10 of tubular portion 10, outer shield 1 solely constitutes electrically-closed loop LO4. Outer shield 1 may constitute electrically-closed loop LO4 together with conductor 170 and/or 180 of circuit board 150. That is, in the case that a gap is provided in outer shield 1, conductor 170 and/or 180 may constitute a path connecting both ends of the gap to each other, and electrically-closed loop LO4 may include this path. Here, conductor 170 and/or 180 may not necessarily be included in the configuration of socket S1.

(2.2) Configuration of Header

A configuration of header H1 according to the exemplary embodiment will be described below. Description of components of header H1 that are similar to those of socket S1 will be appropriately omitted.

Header H1 is two-fold symmetric with respect to a symmetric axis passing through the center of header H1 along up-down direction Dud. As illustrated in FIG. 5, header H1 includes outer shield 5, housing 6, plural (two) inner shields 7, and plural (eight) terminals 8. Each of outer shield 5 and inner shields 7 is an electrostatic shield. Outer shield 5 surrounds plural terminals 8. That is, outer shield 5 is disposed outside plural terminals 8. Inner shields 7 are arranged inside outer shield 5. Inner shields 7 are arranged inside housing 6.

Figure 6:
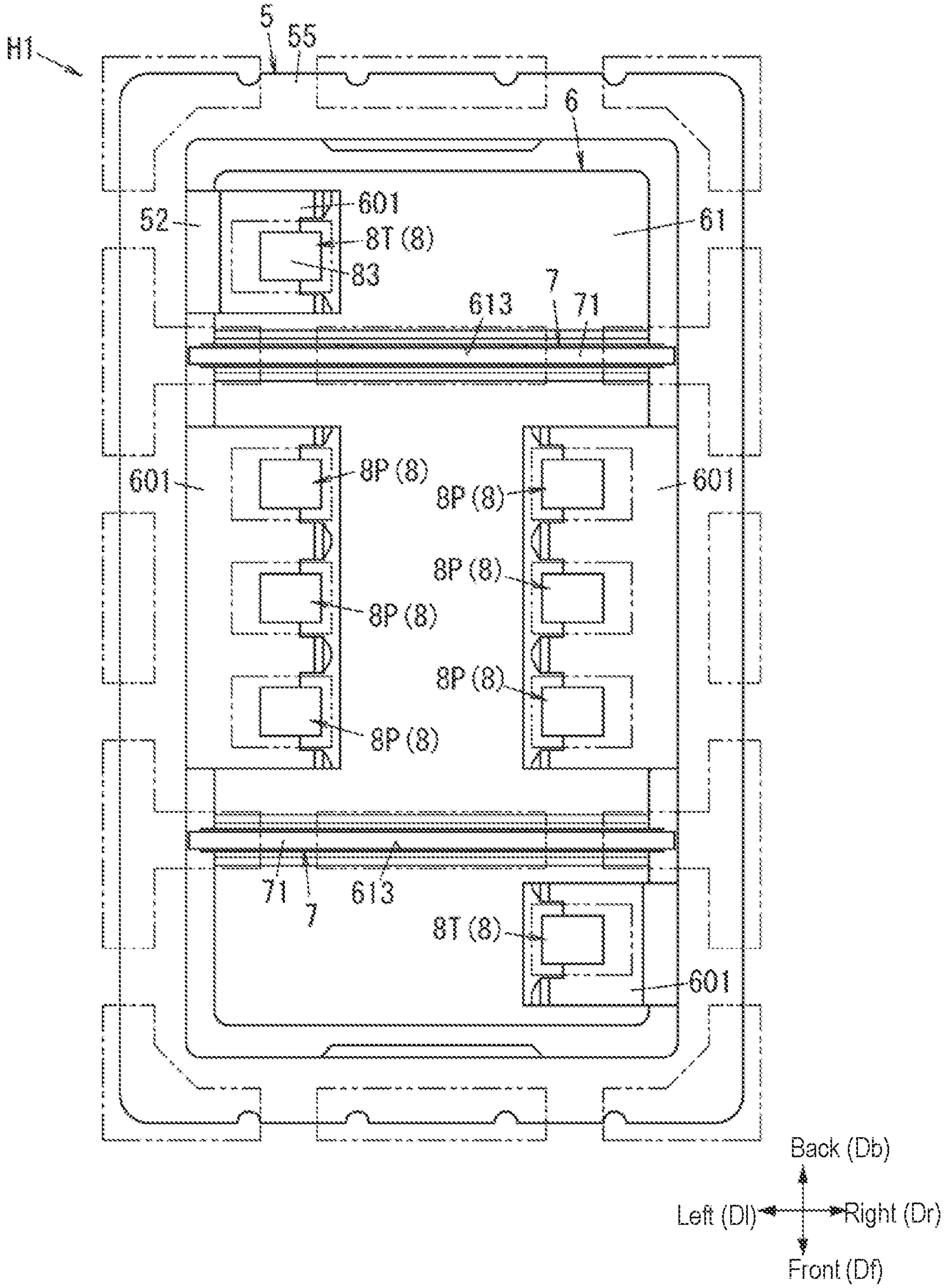
FIG. 6 is a plan view of the header.

Circuit board 550 (see FIG. 9) is mechanically and electrically connected to header H1. Circuit board 550 includes substrate 560 (see FIG. 9) and conductors 570 and 580 (see FIG. 9) as components similar to substrate 160 and conductors 170 and 180 of circuit board 150 connected to socket S1. For example, conductor 570 is provided on substantially the entire surface of substrate 560 on the side on which header H1 is connected. In FIG. 6, a region in which conductor (solder) 580 is provided is denoted by a two-dot chain line.

(2.2.1) Housing of Header

Housing 6 is made of a molded resin. Housing 6 has electrical insulating properties. Housing 6 includes bottom wall 61 and peripheral wall 62. Bottom wall 61 has a rectangular shape in which the length thereof in front-back direction Dfb is longer than the length thereof in left-right direction Dlr in a plan view. Peripheral wall 62 protrudes from the outer circumferential portion of one surface (lower surface) of bottom wall 61 in downward direction Dd, i.e., a thickness direction of the bottom wall. The left side surface and the right side surface of housing 6 have plural notches 601 (two on the left side surface and two on the right side surface in FIG. 5) penetrating bottom wall 61 and peripheral wall 62 in up-down direction Dud. Plural notches 601 are provided at positions facing board connection portions 83 of terminals 8 when viewed in up-down direction Dud (see FIG. 6).

Figure 7:
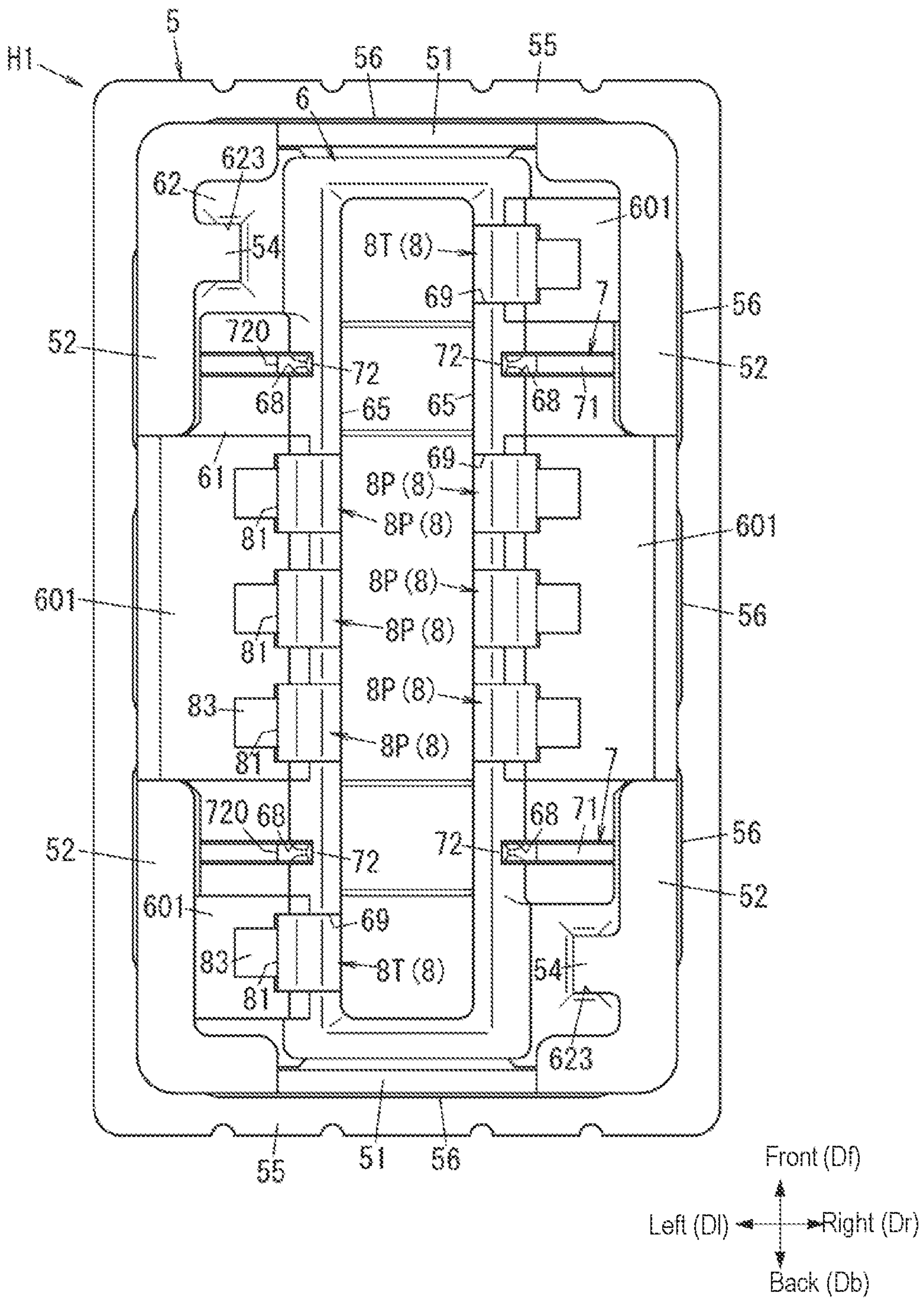
FIG. 7 is a bottom view of the header.

As illustrated in FIG. 7, housing 6 further includes two wall portions 65. Each of wall portions 65 protrudes from bottom wall 61 in downward direction Dd. Wall portion 65 has a rectangular parallelepiped shape having a cylindrical lower surface (see FIG. 10). The front end and the back end of wall portion 65 are connected to peripheral wall 62. When viewed in up-down direction Dud, wall portion 65 is longer in front-back direction Dfb than in left-right direction Dlr. That is, wall portion 65 has a thickness in the direction along left-right direction Dlr. Two wall portions 65 are arranged in left-right direction Dlr.

Each of wall portions 65 includes plural (two) accommodation portions 68. Each of extensions 72 of inner shield 7 is accommodated in respective one of plural accommodation portions 68. Each of accommodation portions 68 is a through-hole provided in wall portion 65. Accommodation portion 68 passes through wall portion 65 in up-down direction Dud. Accommodation portion 68 also penetrates bottom wall 61 in up-down direction Dud. When viewed in up-down direction Dud, accommodation portions 68 provided in wall portion 65 are recesses penetrating from the side surface (surface intersecting in left-right direction Dlr) of wall portion 65.

Each of wall portions 65 includes plural (four) terminal holders 69. Each of terminal 8 is held by respective one of terminal holders 69. Each terminal holder 69 is a dent provided in wall portion 65.

Plural terminals 8 are insert-molded with housing 6. In the exemplary embodiment, eight terminals 8 are fixed to housing 6. Each of eight terminals 8 of header H1 corresponds to respective one of eight terminals 4 of socket S1. Each of terminals 8 is disposed at a position to be connected to corresponding one of terminals 4.

As illustrated in FIGS. 5 and 6, bottom wall 61 has plural (two) accommodation grooves 613 provided therein. Each of accommodation grooves 613 is a groove provided in the upper surface of bottom wall 61. Accommodation groove 613 is longer in left-right direction Dlr than in front-back direction Dfb. Accommodation groove 613 accommodates base 71 of inner shield 7 therein.

As illustrated in FIG. 7, peripheral wall 62 includes plural (two) insertion portions 623. Each of plural (two) insertion portions 623 is a recess provided in the bottom surface (lower surface) of peripheral wall 62. As described later, shield protrusion 54 which is a portion of outer shield 5 is inserted into each of plural (two) of insertion portions 623.

(2.2.2) Outer Shield of Header

Figure 8:
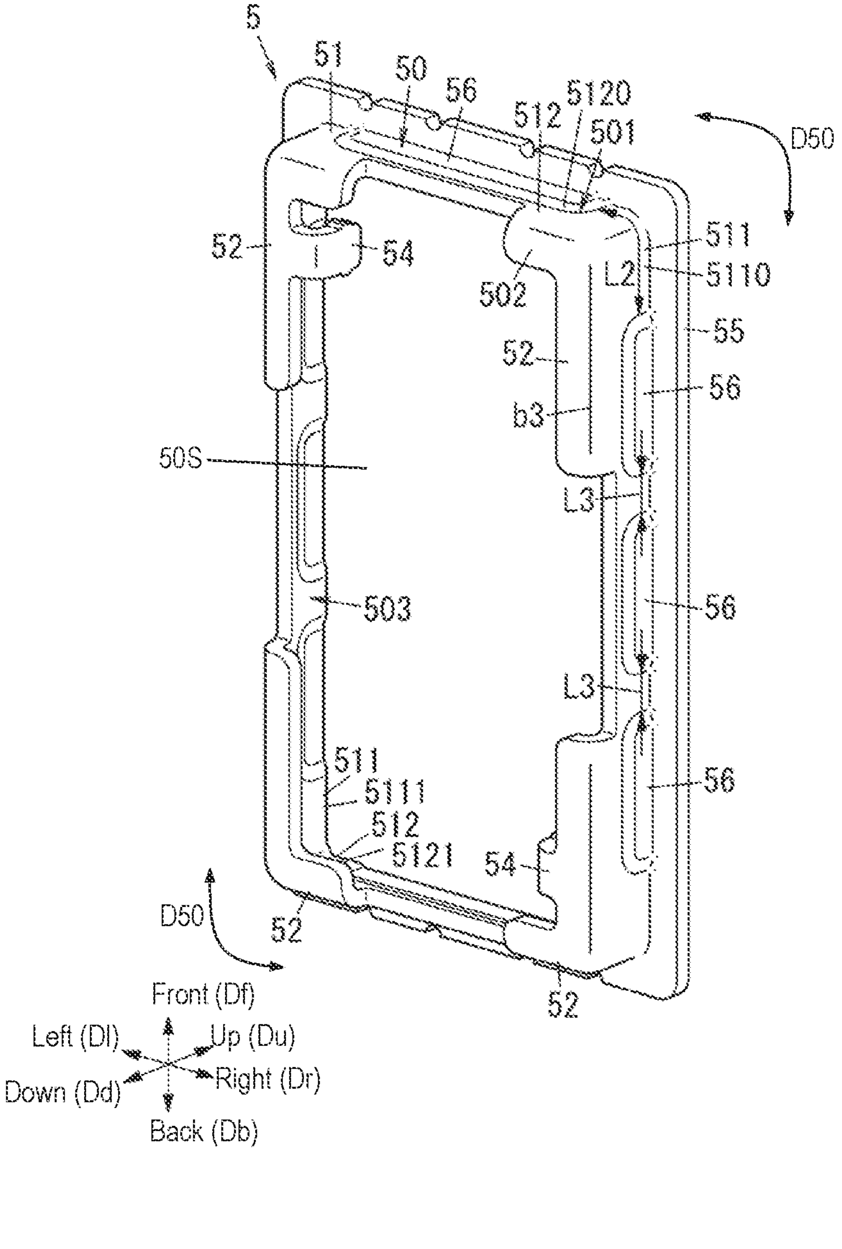
FIG. 8 is a perspective view of an outer shield of the header.

Outer shield 5 surrounds plural terminals 8 and plural inner shields 7. Outer shield 5 contains metal as a main material or a material forming the surface, such as plating. Here, outer shield 5 is made of metal as the main material. As illustrated in FIGS. 5 and 8, outer shield 5 includes outer peripheral wall 51, plural (four) top walls 52, plural (two) shield protrusions 54, and bottom wall 55.

Outer peripheral wall 51 has a rectangular tubular shape with a rectangular cross section. Outer peripheral wall 51 includes two outer peripheral walls 511 and two outer peripheral walls 512. Two outer peripheral walls 511 are portions of outer peripheral wall 51, and extend substantially in front-back direction Dfb. Two outer peripheral walls 511 face each other in left-right direction Dlr. Two outer peripheral walls 512 are portions of outer peripheral wall 51, and extend substantially in left-right direction Dlr. Two outer peripheral walls 512 face each other in front-back direction Dfb. Each of two outer peripheral walls 512 connects the ends of two outer peripheral walls 511 to each other.

Outer shield 5 further includes plural protrusions 56 that protrude from outer peripheral wall 51. Protrusions 56 function as contact portions configured to contact outer shield 1 of the mating connector (here, socket S1). Outer peripheral wall 51, top wall 52, and protrusions 56 constitute tubular portion 50 having both ends which are open in up-down direction Dud. That is, tubular portion 50 includes outer peripheral wall 51, top wall 52, and plural protrusions 56. Outer circumferential surface 501 of tubular portion 50 includes a portion of the outer circumferential surface of outer peripheral wall 51 and surfaces of protrusions 56. Tubular portion 50 surrounds hollow space 50S.

Outer shield 5 of the connector (here, header H1) has a side surface (outer circumferential surface 501) in up-down direction Dud. The side surface (outer circumferential surface 501) has a protruding structure. That is, a structure formed by plural protrusions 56 corresponds to the protruding structure. Outer shield 5 of the connector (here, header H1) contacts outer shield 1 of the mating connector (here, socket S1) at the protruding structure (plural protrusions 56). More specifically, protrusions 56 contact inner circumferential surface 103 of tubular portion 10 of outer shield 1 (see FIG. 10).

In comparison to a connector where outer circumferential surface 501 is flat without protrusions 56, outer shield 1 of the connector according to the embodiment may be pushed into outer shield 5 even though the dimensions of outer shields 1 and 5 have variations. This configuration reduces poor contact occurring such that outer shields 1 and 5 contact each other in one direction in left-right direction Dlr or one direction in front-back direction Dfb and are separated from each other in the other directions.

Each of two outer peripheral walls 511 includes three protrusions 56. One protrusion 56 is provided on two outer peripheral walls 512. Plural protrusions 56 are spaced from each other along circumferential direction D50 (see FIG. 8) surrounding hollow space 50S of tubular portion 50. The maximum value of creepage distances L2 and L3 between plural protrusions 56 is equal to or less than ¼ of wavelength λ of the maximum frequency of a transmission signal flowing through terminal 8. This configuration reduces noise leaking from a region between plural protrusions 56 (region of outer shield 5 that is not electrically connected to outer shield 1). Here, creepage distance L2 between protrusion 56 provided on outer peripheral wall 511 and protrusion 56 provided on outer peripheral wall 512 is larger than creepage distance L3 between plural protrusions 56 provided on outer peripheral wall 511. That is, the maximum value of the creepage distance between plural protrusions 56 is creepage distance L2. Here, the maximum frequency refers to the maximum frequency of the transmission signal flowing through high-frequency terminal 8T among plural terminals 8. That is, in the exemplary embodiment, the maximum frequency is determined in accordance with the specifications of the high-frequency terminal 8T.

Each of plural (four) top walls 52 has an L-shape when viewed in up-down direction Dud. Plural (four) top walls 52 are connected to the lower ends of the four corners of outer peripheral wall 51, and extend toward the inside of outer peripheral wall 51 when viewed in up-down direction Dud.

Bottom wall 55 has a rectangular frame shape when viewed in up-down direction Dud. Bottom wall 55 is connected to the upper end of outer peripheral wall 51 and extends toward the outside of outer peripheral wall 51 when viewed in up-down direction Dud. The lower surface of bottom wall 55 extends in front-back direction Dfb and left-right direction Dlr, that is, parallel to a plane perpendicular to up-down direction Dud.

The inner circumferential surface of outer peripheral wall 51 corresponds to inner circumferential surface 503 of tubular portion 50. Outer shield 5 has distal end surface 502. Distal end surface 502 is provided at one end (lower end) of tubular portion 50 among both the ends of tubular portion 50 in up-down direction Dud. The one end is on the mating connector side when the connector (here, header H1) and the mating connector (here, socket S1) are transitioned from the disconnected state to the connected state. Distal end surface 502 extends along the inner edge of tubular portion 50. Here, the upper surface of top wall 52 corresponds to distal end surface 502. The inner edge of distal end surface 502 corresponds to a portion of the inner edge of tubular portion 50 at the lower end of tubular portion 50.

Boundary b3 between distal end surface 502 and outer circumferential surface 501 is an arcuate surface when viewed from front-back direction Dfb (see FIG. 9). Here, distal end surface 502 is defined as a region of the outer surface of tubular portion 50, and forms an acute angle with respect to up-down direction Dud which is equal to or larger than 0 degrees and smaller than 45 degrees. An outer surface of tubular portion 50 forming an acute angle of 45 degrees or larger is defined as outer circumferential surface 501. Boundary b3 has a predetermined length along circumferential direction D50 of tubular portion 50.

Each of plural (two) shield protrusions 54 corresponds to respective one of two of plural (four) top walls 52. Each of shield protrusions 54 protrudes upward from the corresponding top wall 52. Each of plural (two) of shield protrusions 54 corresponds to respective one of plural (two) of insertion portions 623 (see FIG. 7) provided in housing 6. Each of shield protrusions 54 is inserted into corresponding one of insertion portions 623.

Outer shield 5 is fixed to housing 6 by press fitting. That is, outer shield 5 is held in housing 6 by being pushed into housing 6 in one direction (upward). At this moment, plural top walls 52 of outer shield 5 cover at least a portion of peripheral wall 62 of housing 6. At this moment, each of shield protrusions 54 is inserted into corresponding insertion portion 623.

The entire surface of outer shield 5 is seamlessly formed. In the exemplary embodiment, at least outer circumferential surface 501 and inner circumferential surface 503 among the surfaces of outer shield 5 are seamless over the entirety of tubular portion 50 along circumferential direction D50 (that is, there are no seams or breaks).

As illustrated in FIG. 8, outer circumferential surface 501 includes outer surface 5110 and outer surface 5120. Outer surface 5110 includes the surface of outer peripheral wall 511 and the surface of protrusion 56, and corresponds to each of two outer peripheral walls 511. Outer surface 5120 includes the surface of outer peripheral wall 512 and the surface of protrusion 56, and corresponds to each of two outer peripheral walls 512. Each of outer surface 5110 and outer surface 5120 is seamless. Outer surface 5110 and outer surface 5120 having different normal directions are seamlessly connected to each other. Outer circumferential surface 501 is thus seamless over the entirety of tubular portion 50 along circumferential direction D50.

As illustrated in FIG. 8, inner circumferential surface 503 includes inner surface 5111 of each of two outer peripheral walls 511 and inner surface 5121 of each of two outer peripheral walls 512. Each of inner surface 5111 and inner surface 5121 is seamless. Inner surface 5111 and inner surface 5121 having different normal directions, re seamlessly connected to each other. Inner circumferential surface 503 is thus seamless over the entirety of tubular portion 50 along circumferential direction D50.

Boundary b3 between outer circumferential surface 501 and distal end surface 502 is seamless. For example, at the upper right (corner portion of outer shield 5) of the surface of paper in FIG. 8, outer surface 5110, outer surface 5120, and distal end surface 502 having different normal directions are seamlessly connected.

(2.2.3) Inner Shield of Header

In the exemplary embodiment, two inner shields 7 have the same shape. Inner shield 7 contains metal as a main material or a material forming the surface, such as plating. Here, inner shield 7 is made of metal as main material. As illustrated in FIG. 9, inner shield 7 includes base 71 and plural (two) extensions 72.

Base 71 has a length in left-right direction Dlr. Base 71 has a plate shape. When viewed in the thickness direction (front-back direction Dfb) of base 71, base 71 is longer in left-right direction Dlr than in up-down direction Dud. Base 71 is accommodated in accommodation groove 613 provided in bottom wall 61 of housing 6.

Plural extensions 72 protrude downward from base 71. That is, plural extensions 72 protrude in up-down direction Dud to be directed to the mating connector side when the connector (here, header H1) and the mating connector (here, socket S1) are transitioned from the disconnected state to the connected state. Each of extensions 72 has a rectangular plate shape. When viewed in the thickness direction (front-back direction Dfb) of each of extensions 72, each of extensions 72 is longer in up-down direction Dud than in left-right direction Dlr. The thickness direction of extension 72 may be left-right direction Dlr.

Extension 72 includes contacting portion 720 (contact surface) configured to contact inner shield 3 of the mating connector (socket S1). Contacting portion 720 is provided on a surface (here, left surface or right surface) of extension 72 in the longitudinal direction of extension 72. Contacting portions 720 of two extensions 72 are directed in opposite directions (rightward direction Dr and leftward direction DO.

Header H1 includes two extensions 72 on each of two inner shields 7. That is, header H1 includes four extensions 72 in total. Each of four accommodation portions 68 (see FIG. 7) provided in housing 6 corresponds to respective one of four extensions 72. Each of extensions 72 is accommodated in corresponding accommodation portion 68.

Inner shield 7 is fixed to housing 6 by press fitting. That is, inner shield 7 is held in housing 6 by being pushed into housing 6 in one direction (downward). At this moment, each of extensions 72 is accommodated in corresponding accommodation portion 68. Here, the accommodation space of each of two extensions 72 in the shield holder (accommodation portion 68) is larger than each of two extensions 72.

As illustrated in FIG. 9, base 71 of inner shield 7 is located at the upper end of header H1. Here, outer shield 5 has end e5 and end e6. End e5 is an end (lower end) that is on the mating connector side when the connector (here, header H1) and the mating connector (here, socket S1) are transitioned from the disconnected state to the connected state. End e6 is an end (upper end) opposite to end e5. Here, end e6 covers the entire circumference along circumferential direction D50 that surrounds hollow space 50S of bottom wall 55 of outer shield 5. Outer shield 5 faces two tip regions r7 of inner shield 7 in a region including end e6.

Outer shield 5 faces at least one of two tip regions r7 with gap g7, in the region including end e6. As illustrated in FIG. 9, conductors 570 and 580 of circuit board 550 are electrically connected to outer shield 5. Conductors 570 and 580 are provided to bridge end e6 of outer shield 5 over two tip regions r7 of inner shield 7, respectively. That is, outer shield 5 is electrically connected to inner shield 7 through conductors 570 and 580. While circuit board 550 is not provided, outer shield 5 is electrically insulated from at least one (both in the exemplary embodiment) of two tip regions r7 via gap g7. Shortest distance L7 between outer shield 5 and at least one of two tip regions r7 in gap g7 is equal to or greater than 0.01 mm and equal to or less than 0.1 mm.

Inner shield 7 has end e7 and end e8. End e7 is an end (lower end) that is on the mating connector side when the connector (here, header H1) and the mating connector (here, socket S1) are transitioned from the disconnected state to the connected state. End e8 is an end (upper end) opposite to end e7. Inner shield 7 has connection surface 710 (upper surface) at end e8. Connection surface 710 is configured to be electrically connected to circuit board 550. Connection surface 710 is flat and continuously extends over two tip regions r7. More specifically, connection surface 710 has a rectangular flat surface connecting two tip regions r7 to each other.

(2.2.4) Terminal of Header

As illustrated in FIGS. 6 and 7, plural (eight) terminals 8 include plural (six) low-frequency terminals 8P and plural (two) high-frequency terminals 8T. The arrangement of plurality of terminals 8 is similar to the arrangement of plurality of terminals 4 of socket S1. That is, the content described in the section of "(2.1.4.1) Arrangement" is also applied to plural terminals 8.

Terminals 8 have the same shape. Terminals 8 are formed by, for example, punching and bending a metal plate. As illustrated in FIG. 11, each of terminals 8 includes contact portion 81, winding tongue 82, board connection portion 83, and contact portion 84.

Board connection portion 83 is configured to be electrically connected to, for example, conductor 580 (solder) of circuit board 550. That is, board connection portion 83 is bonded to circuit board 550 by, e.g. soldering. Thus, circuit board 550 is electrically and mechanically connected to terminals 8. As illustrated in FIG. 6, board connection portion 83 is surrounded by outer shield 5 when viewed in up-down direction Dud. At least a portion of board connection portion 83 and at least a portion of outer shield 5 are flush on one plane perpendicular to up-down direction Dud.

Contact portion 81 and contact portion 84 have lengths in up-down direction Dud. Contact portion 81 is configured to contact contact portion 41 of terminal 4 of socket S1. Contact portion 84 is configured to contact contact portion 46 of terminal 4 of socket S1. Winding tongue 82 has a U-shape opening in upward direction Du. Winding tongue 82 joins the lower end portion of contact portion 81 to the lower end portion of contact portion 84. Board connection portion 83 protrudes from the upper end portion of contact portion 81.

While terminal 8 is held in housing 6, at least a portion of contact portion 81 and contact portion 84 is exposed when viewed from below. Contact portion 81 and contact portion 84 contact corresponding terminals 4 among plural terminals 4 (mating terminals) of socket S1 (mating connector) to be electrically connected to terminal 4 (see FIG. 12).

Terminal 8 further includes force-sensing portion 85. Force-sensing portion 85 generates a click feeling when terminal 8 contacts terminal 4 (mating terminal). Force-sensing portion 85 is a protrusion that protrudes from contact portion 81. Upon moving over force-sensing portion 47 of terminal 4, force-sensing portion (protrusion) 85 generates a click feeling.

Contact portion 84 has dent 840 in a contact surface of contact portion 84 contacting contact portion 46. That is, contact portion 46 is inserted into dent 840. Here, contact portion 46 contacts a side surface of dent 840.

As illustrated in FIG. 7, contacting portion 720 of inner shield 7 and contact portion 81 of at least one of plural terminals 8 are arranged in front-back direction Dfb.

(2.2.5) Circuit Board on Header Side

Header H1 is configured to be electrically connected to conductor 580 (solder) on circuit board 550. In FIG. 6, a region in which conductor 580 is provided on the upper surface of header H1 is denoted by a two-dot chain line. The arrangement and the electrical connection relation of conductors 570 and 580 of circuit board 550, outer shield 5, plural inner shields 7, and plural terminals 8 are similar to the arrangement and the electrical connection relation of conductors 170 and 180 of circuit board 150, outer shield 1, plural inner shields 3, and plural terminals 4 of socket S1.

(2.2.6) Electrically-Closed Loop of Header

The arrangement of outer shield 5, plural (two) inner shields 7, and plural (eight) terminals 8 of header H1 is similar to the arrangement of outer shield 1, plural (two) inner shields 3, and plural (eight) terminals 4 of socket S1 which is illustrated in FIG. 13. Therefore, in header H1, similar to socket S1, at least plural (three) electrically-closed loops LO1, LO2, and LO3 are formed. The details regarding electrically-closed loops LO1, LO2, and LO3 of header H1 are similar to the details regarding electrically-closed loops LO1, LO2, and LO3 of socket S1. Outer shield 5 constitutes electrically-closed loop LO4 surrounding terminal 8 without inner shield 7, similar to outer shield 1.

Here, since outer shield 5 has no gap along circumferential direction D50 of tubular portion 50, outer shield 5 solely constitutes electrically-closed loop LO4. Outer shield 5 may constitute electrically-closed loop LO4 together with conductor 570 and/or 580 of circuit board 550. That is, in the case that a gap is formed in outer shield 5, conductor 570 and/or 580 may constitutes a path connecting both ends of the gap to each other, and electrically-closed loop LO4 may include this path. Here, conductor 570 and/or 580 may not necessarily be included in the configuration of header H1.

(3) Assembling Process

Processes of connecting socket S1 to header H1 so as to assemble connector device 100 will be described below with reference to FIGS. 9 to 12.

Figure 12:
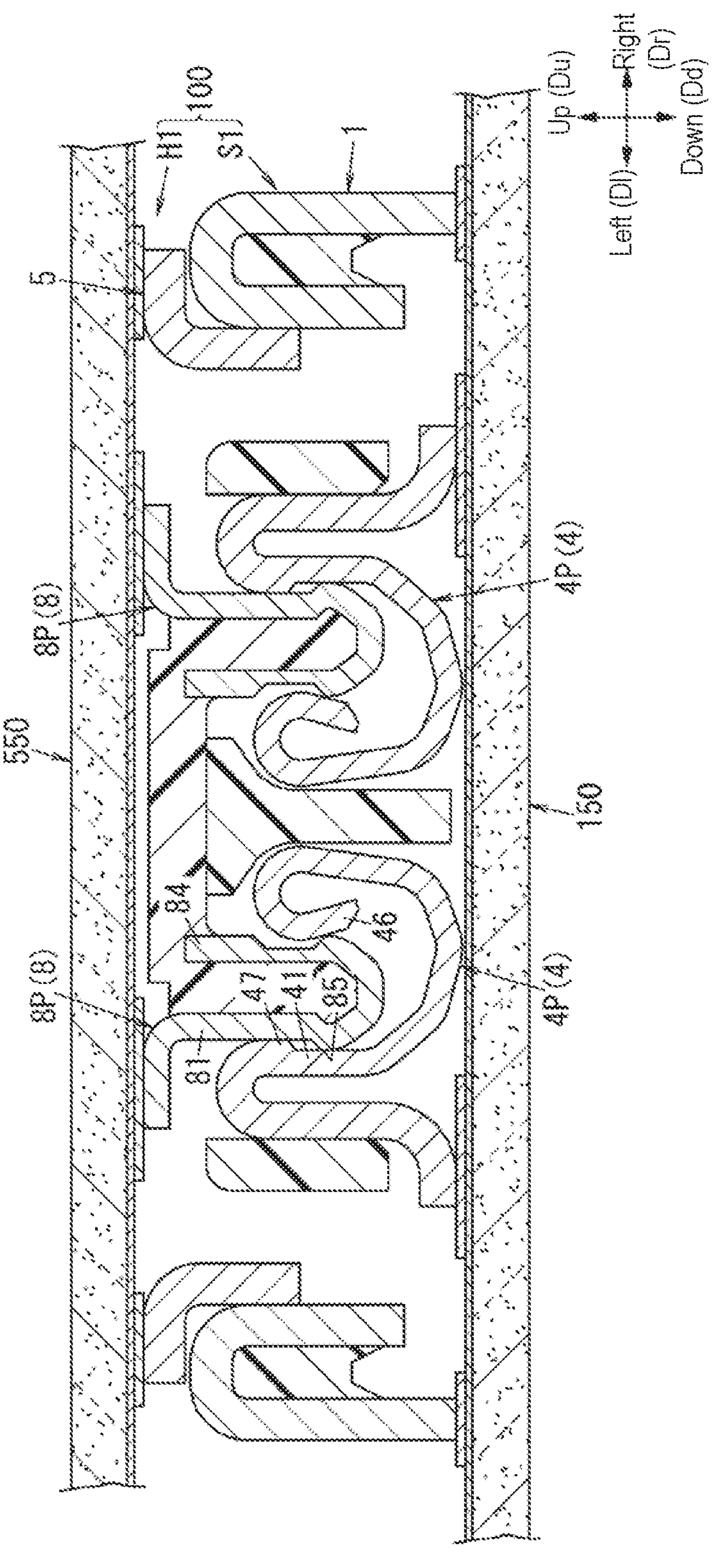
FIG. 12 is a sectional view of the connector where the socket is connected to the header, illustrating the two terminals of each of the socket and the header.

Circuit board 150 is mechanically and electrically connected to socket S1. Circuit board 550 is mechanically and electrically connected to header H1. In this state, as illustrated in FIGS. 9 and 11, socket S1 is disposed below header H1. At least one of the upward movement of socket S1 and the downward movement of header H1 is performed. Thus, as illustrated in FIGS. 10 and 12, socket S1 and header H1 are mechanically connected. As illustrated in FIG. 10, inner shield 3 of socket S1 and inner shield 7 of header H1 contact each other and are electrically connected to each other. As illustrated in FIG. 12, plural terminals 4 of socket S1 and plurality of terminals 8 of header H1 contact each other and are electrically connected to each other. As illustrated in FIGS. 10 and 12, outer shield 1 of socket S1 and outer shield 5 of header H1 contact each other and are electrically connected to each other. As illustrated in FIG. 10, two wall portions 65 of housing 6 of header H1 are inserted into a space between wall portion 25 and wall portion 26 of housing 2 of socket S1 and a space between wall portion 26 and wall portion 27.

Here, when socket S1 and header H1 (connector and the mating connector) are transitioned from the disconnected state to the connected state, the components of socket S1 and the components of header H1 contact each other in the following order.

First, socket S1 contacts header H1 at outer shields 1 and 5. That is, a region of socket S1 near the upper end of inner circumferential surface 103 of tubular portion 10 of outer shield 1 contacts a region of header H1 near the lower end of outer circumferential surface 501 of tubular portion 50 of outer shield 5.

Then, socket S1 contacts header H1 at terminals 4 and 8. That is, at least one of a case where contact portion 41 contacts contact portion 81 and a case where contact portion 46 contacts contact portion 84 is performed.

Then, socket S1 contacts header H1 at inner shields 3 and 7. That is, contacting portion 332 of inner shield 3 contacts contacting portion 720 of inner shield 7.

Then, force-sensing portion 47 (or 85) of the connector (socket S1 or header H1) contacts the mating terminal (terminal 8 or 4). That is, at least one of a case where force-sensing portion 47 contacts contact portion 81 of terminal 8 and a case where force-sensing portion 85 contacts contact portion 41 of terminal 4 is performed. The force-sensing portions 47 and 85 generate a click feeling.

Then, outer shield 5 of the connector (here, header H1) contact outer shield 1 of the mating connector (here, socket S1) at the protruding structure (plural protrusions 56 also referred to as contact portions). That is, plural protrusions 56 contact inner circumferential surface 103 of tubular portion 10 of outer shield 1 (see FIG. 10). More specifically, firstly, plural protrusions 56 contact the region near the upper end of inner circumferential surface 103. Then, contact pressure between each protrusion 56 and inner circumferential surface 103 further moves plural protrusions 56 down while outer shield 1 elastically deforms so that inner peripheral wall 13 of outer shield 1 is directed toward the outer side (outer peripheral wall 11 side). Finally, as illustrated in FIG. 10, plural protrusions 56 contact a region of inner circumferential surface 103 along up-down direction Dud. Socket S1 is thus connected to header H1.

As described above, a click feeling is generated at terminals 4 and 8 before the contact pressure and a frictional force between outer shields 1 and increases by plural protrusions 56 contacting outer shield 1. Therefore, the worker can perceive the click feeling more easily than a connector where the click feeling is generated after plural protrusions 56 contact outer shield 1, thus preventing the click feeling by the frictional force from being perceived. The positional relation between outer shields 1 and 5 fixed by plural protrusions 56 contacting outer shield 1 is not changed in the subsequent processes, and thus, improves the positioning accuracy, accordingly, securing the contact area between outer shields 1 and 5.

(4) Noise Level

Figure 14:
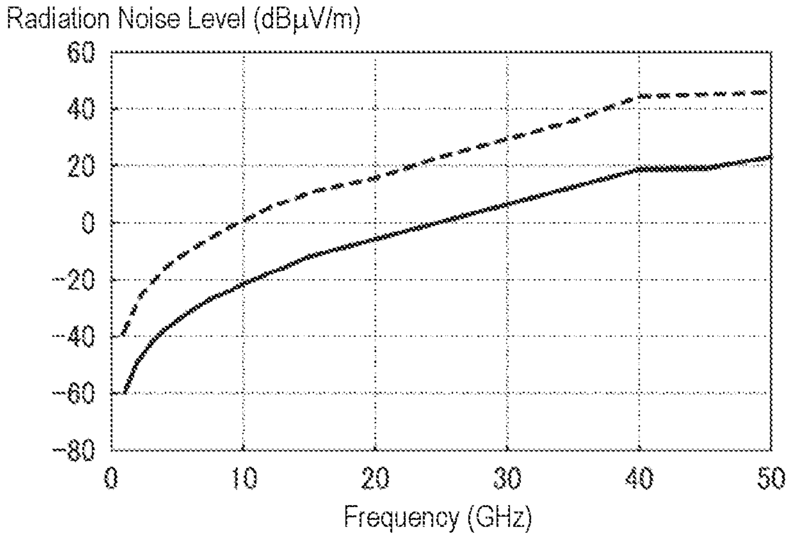
FIG. 14 is a graph illustrating a noise level of the socket and the header and a noise level of a comparative example of a socket and a header.

The solid line in FIG. 14 represents the analysis result of radiation noise of connector device 100 in the exemplary embodiment. The broken line in FIG. 14 represents the analysis result of the radiation noise of a comparative example of a connector device. The horizontal axis represents a frequency [GHz]. The vertical axis represents the noise level ([dBpμV/m]).

The comparative example of the connector device is different from connector device 100 in the exemplary embodiment in that each of outer shields 1 and 5 is formed by bending a metal plate. Other components of the connector device in the comparative example are the same as those in connector device 100 in the exemplary embodiment. Therefore, there are seams or breaks in circumferential direction D10 (D50) of tubular portion 10 (50), for example, on the outer circumferential surface and the inner circumferential surface of tubular portion 10 (50) of each of outer shields 1 and 5 of the connector device in the comparative example. On the other hand, in connector device 100 in the exemplary embodiment, each of outer shields 1 and 5 is formed by drawing a metal. Therefore, the outer circumferential surface and the inner circumferential surface of tubular portion 10 (50) of each of outer shields 1 and 5 are seamlessly formed over the entire circumference of tubular portion 10 (50) along circumferential direction D10 (D50), so that there are no seams or breaks therein.

As illustrated in FIG. 14, the noise level of connector device 100 in the exemplary embodiment is lower than that of the comparative example of the connector device at each frequency. That is, in comparison to the comparative example, in the exemplary embodiment, since the seams of outer shields 1 and 5 are removed, not only an effect of suppressing the influence of resonance, but also an effect of reducing the noise radiated from the seams are obtained.

Modification Example 1

Figure 15:
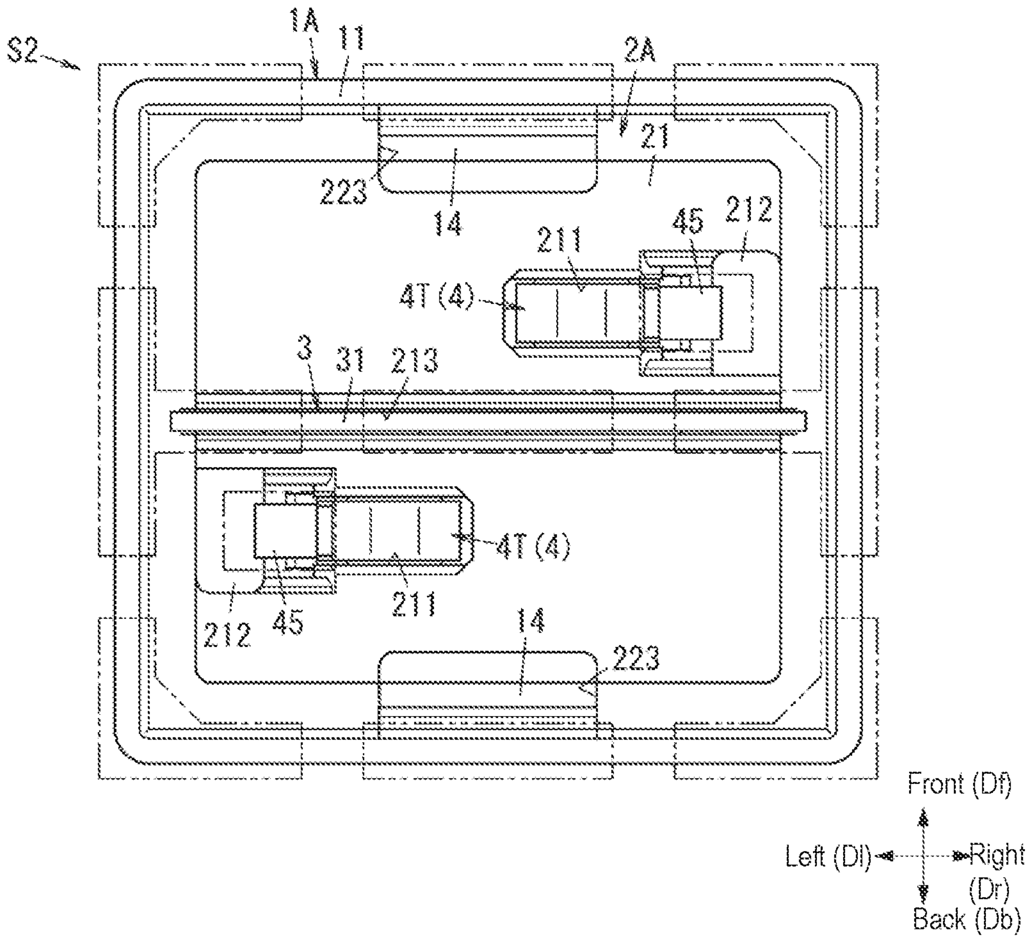
FIG. 15 is a bottom view of modification example 1 of the socket.

Socket S2 and header H2 according to modification example 1 will be described below with reference to FIGS. 15 to 18. Components similar to those in the exemplary embodiment are denoted by the same reference numerals, and the description thereof will be omitted. In FIGS. 15 and 17, regions in which the conductors (solder) 180 and 580 are provided are indicated by two-dot chain lines.

Figure 16:
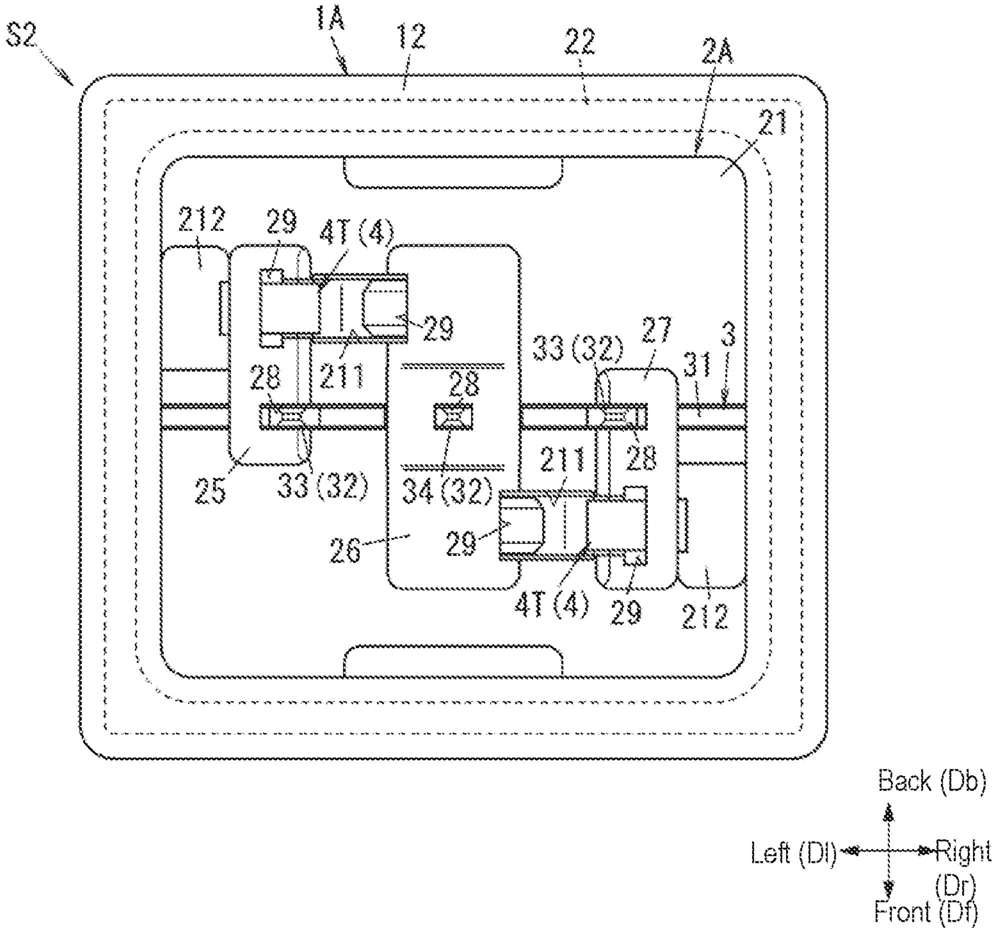
FIG. 16 is a plan view of modification example 1 of the socket.
Figure 17:
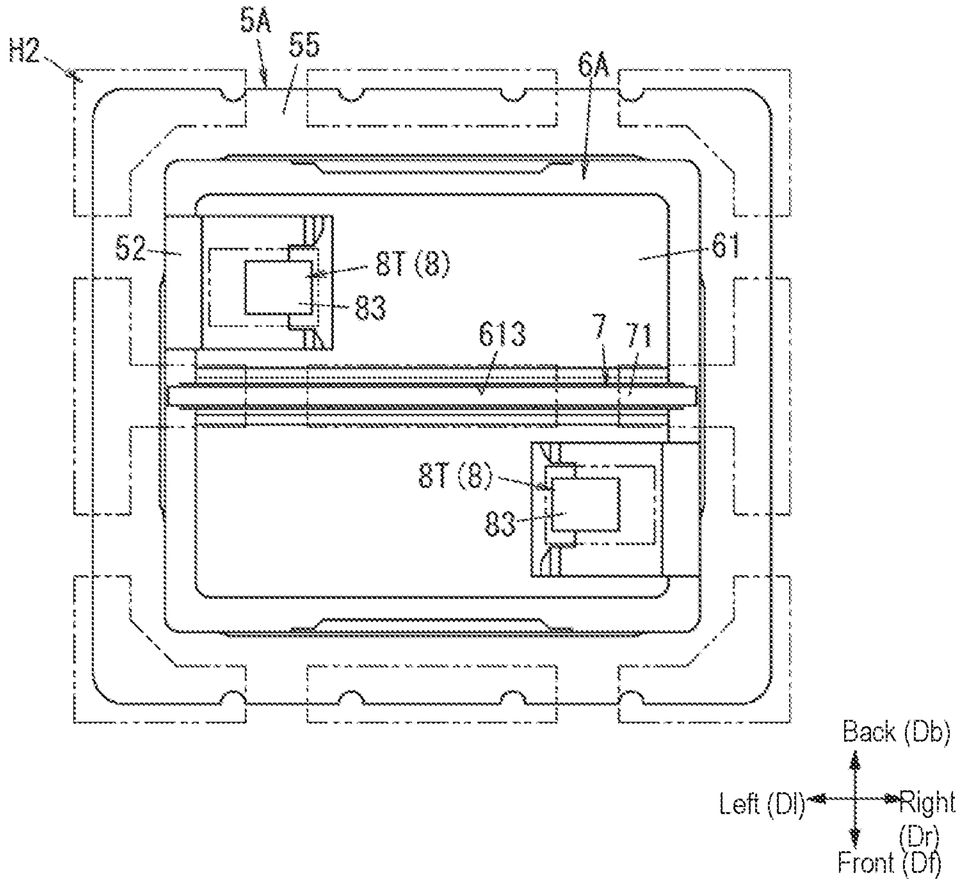
FIG. 17 is a plan view of modification example 1 of the header.

As illustrated in FIGS. 15 and 16, socket S2 includes only one inner shield 3. Socket S2 includes only two terminals 4. Thus, the shapes of outer shield 1A and housing 2A are different from the shapes of outer shield 1 and housing 2 in the exemplary embodiment. These configurations will be detailed below.

Housing 2A schematically has a shape in which the region in which six low-frequency terminals 4P are provided is omitted from housing 2 in the exemplary embodiment. Outer shield 1A schematically has a shape in which the region in which six low-frequency terminals 4P are provided is omitted from outer shield 1 in the exemplary embodiment.

Each of wall portion 25, wall portion 26, and wall portion 27 of housing 2 includes one accommodation portion 28. Three extensions 32 of inner shield 3 are accommodated in three accommodation portions 28, respectively.

Each of wall portion 25 and wall portion 27 includes one terminal holder 29. Wall portion 26 includes two terminal holders 29. One of two terminals 4 is held by terminal holder 29 of wall portion 25 and one terminal holder 29 of wall portion 26. The other of two terminals 4 is held by terminal holder 29 of wall portion 27 and the other terminal holder 29 of wall portion 26.

Two terminals 4 are high-frequency terminals 4T, but the present disclosure is not limited to this. At least one of two terminals 4 may be low-frequency terminal 4P.

Two high-frequency terminals 4T are arranged on both sides (front side and back side) of inner shield 3. Therefore, similarly to the exemplary embodiment, it is possible to reduce noise propagation between two high-frequency terminals 4T.

Figure 18:
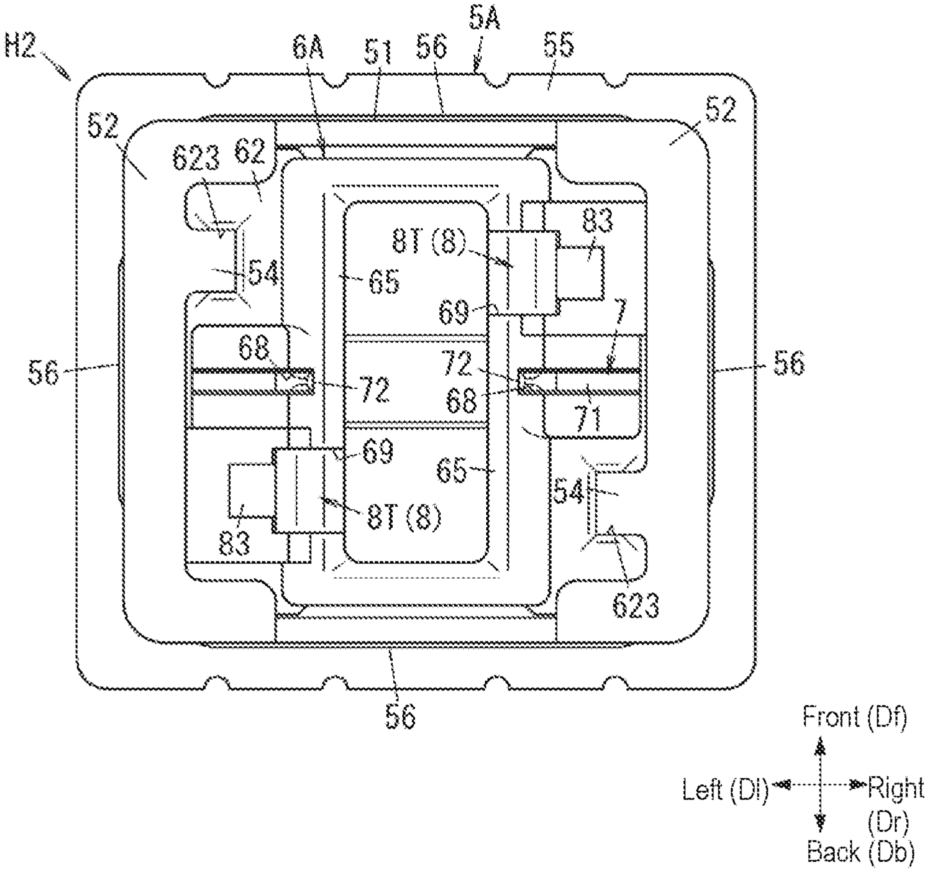
FIG. 18 is a bottom view of modification example 1 of the header.

As illustrated in FIGS. 17 and 18, header H2 includes only one inner shield 7. Header H2 includes only two terminals 8. Thus, the shapes of outer shield 5A and housing 6A are different from the shapes of outer shield and housing 6 in the exemplary embodiment. These configurations will be detailed below.

Housing 6A schematically has a shape in which the region in which six low-frequency terminals 8P are provided is omitted from housing 6 in the exemplary embodiment. Outer shield 5A schematically has a shape in which the region in which six low-frequency terminals 8P are provided is omitted from outer shield 5 in the exemplary embodiment.

Each of two wall portions 65 of housing 6 includes one accommodation portion 68. Two extensions 72 of inner shield 7 are accommodated in two accommodation portions 68, respectively.

Each of two wall portions 65 includes one terminal holder 69. Terminal 8 is held by terminal holder 69.

Two terminals 8 are high-frequency terminals 8T, but the present disclosure is not limited to this. At least one of two terminals 8 may be low-frequency terminal 8P.

Two high-frequency terminals 8T are arranged on both sides (front side and back side) of inner shield 7. Therefore, similarly to the exemplary embodiment, it is possible to reduce the possibility of the noise propagation between the two high-frequency terminals 8T.

Modification Example 2

Figure 19:
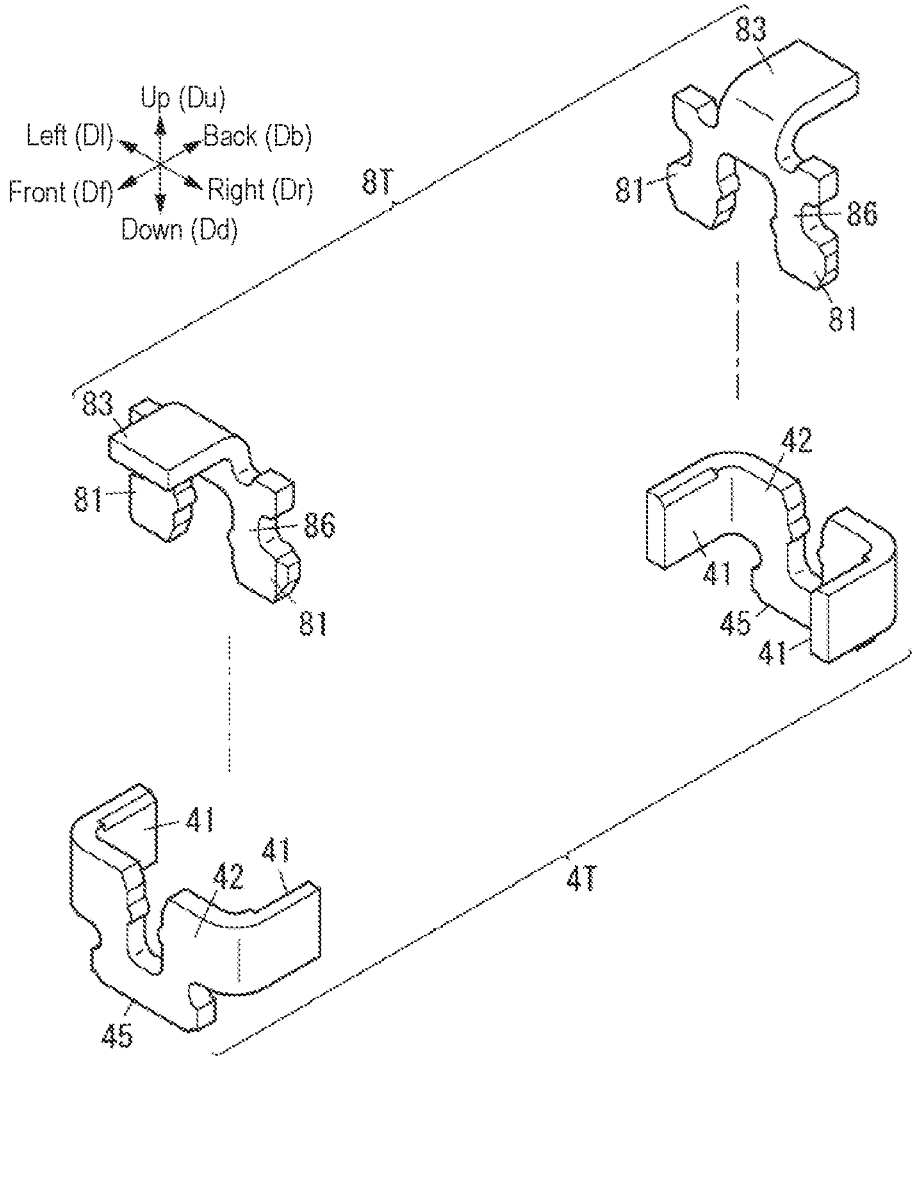
FIG. 19 is a perspective view of modification example 2 of the connector for illustrating two terminals of each of a socket and a header where the socket is separated from the header.
Figure 20:
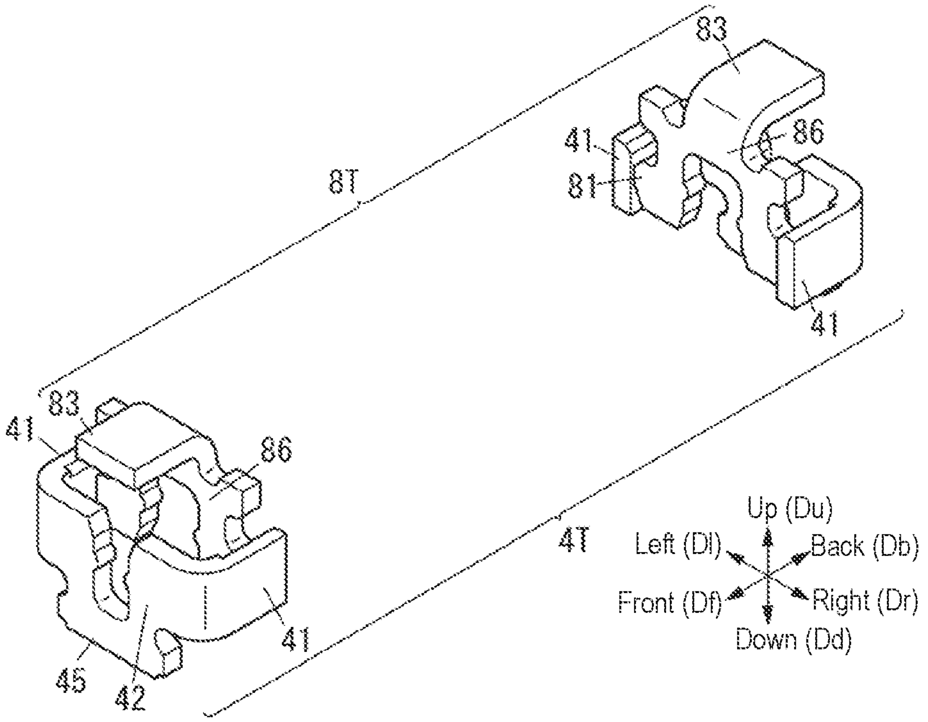
FIG. 20 is a perspective view of modification example 2 of the connector for illustrating two terminals of each of the socket and the header where the socket is connected to the header.

Socket S1 and header H1 according to modification example 2 will be described below with reference to FIGS. 19 and 20. Components similar to those in the exemplary embodiment are denoted by the same reference numerals, and their description thereof will be omitted. In FIGS. 19 and 20, only two high-frequency terminals 4T and two high-frequency terminals 8T in socket S1 and header H1 are extracted and illustrated.

In socket S1 of modification example 2, low-frequency terminal 4P has a different shape from high-frequency terminal 4T. In header H1, low-frequency terminal 8P has a different shape from high-frequency terminal 8T.

That is, socket S1 of modification example 2 includes plural terminals 4. Header H1 includes plural terminals 8. Plural terminals 4 (or 8) include a first terminal (low-frequency terminal 4P or 8P) and a second terminal (high-frequency terminal 4T or 8T). The second terminal has a shape different from the first terminal. Inner shield 3 (or 7) is disposed between the first terminal and the second terminal (see FIG. 13).

For example, low-frequency terminal 4P has a shape similar to the shape of low-frequency terminal 4P in the exemplary embodiment. For example, low-frequency terminal 8P has a shape similar to the shape of the low-frequency terminal 8P in the exemplary embodiment.

For example, high-frequency terminal 4T of modification example 2 includes two contact portions 41, base 42, and board connection portion 45, as illustrated in FIG. 19. High-frequency terminal 4T is formed by, for example, punching and bending a metal plate.

Base 42 is has a U-shape opening in upward direction Du. Board connection portion 45 is connected to the lower end portion of base 42. One contact portion 41 protrudes from the left end of base 42 in front-back direction Dfb. The other contact portion 41 protrudes from the right end of base 42 in front-back direction Dfb.

For example, high-frequency terminal 8T includes two contact portions 81, base 86, and board connection portion 83, as illustrated in FIG. 19. High-frequency terminal 8T is formed by, for example, punching and bending a metal plate.

Base 86 has a U-shape opening in downward direction Dd. Board connection portion 83 is connected to the upper end portion of the base 86. One contact portion 81 protrudes from the left end of the base 86 in leftward direction D1. The other contact portion 81 protrudes from the right end of the base 86 in rightward direction Dr.

In a process for connecting socket S1 to header H1, as illustrated in FIG. 20, each high-frequency terminal 4T is connected to corresponding high-frequency terminal 8T. That is, high-frequency terminal 8T is inserted between two contact portions 41 of high-frequency terminal 4T. Thus, each of the two contact portions 41 contacts corresponding contact portion 81. At this moment, the distance between two contact portions 41 in left-right direction Dlr increase.

Terminals 4 and 8 may have shapes described below. Since low-frequency terminal 4P (8P) may be connected to a power supply wiring and the ground, low-frequency terminal may have a width larger than the width of high-frequency terminal 4T (8T) so as to have low resistance. The contact area between low-frequency terminal 4P and low-frequency terminal 8P may be larger than the contact area between high-frequency terminal 4T and high-frequency terminal 8T so that low-frequency terminals 4P and 8P have low resistance. In order to allow a high-speed signal to pass, high-frequency terminal 4T (8T) may have a shape providing high-frequency terminal with a characteristic impedance matching with the characteristic impedance of a signal line formed on circuit board 150 (550).

Only one of socket S1 and header H1 may include low-frequency terminal 4P (8P) and high-frequency terminal 4T (8T) having shapes different form each other.

OTHER MODIFICATION EXAMPLES OF EXEMPLARY EMBODIMENT

Other modification examples of the exemplary embodiment will be described below. The following modification examples may be realized in appropriate combinations. The following modification examples may be realized in appropriate combination with the above-described first modification example.

Outer shield 1 (5) and inner shield 3 (7) are not necessarily connected electrically to each other through conductor 180 (580) of circuit board 150 (550). Outer shield 1 (5) and inner shield 3 (7) may be electrically connected to each other through another conductive member.

At least one of outer shield 1 (5), plural inner shields 3 (7), and plural of terminals 4 (8) may contact conductor 170 (570), thereby being electrically connected to conductor 170 (570).

Figure 21:
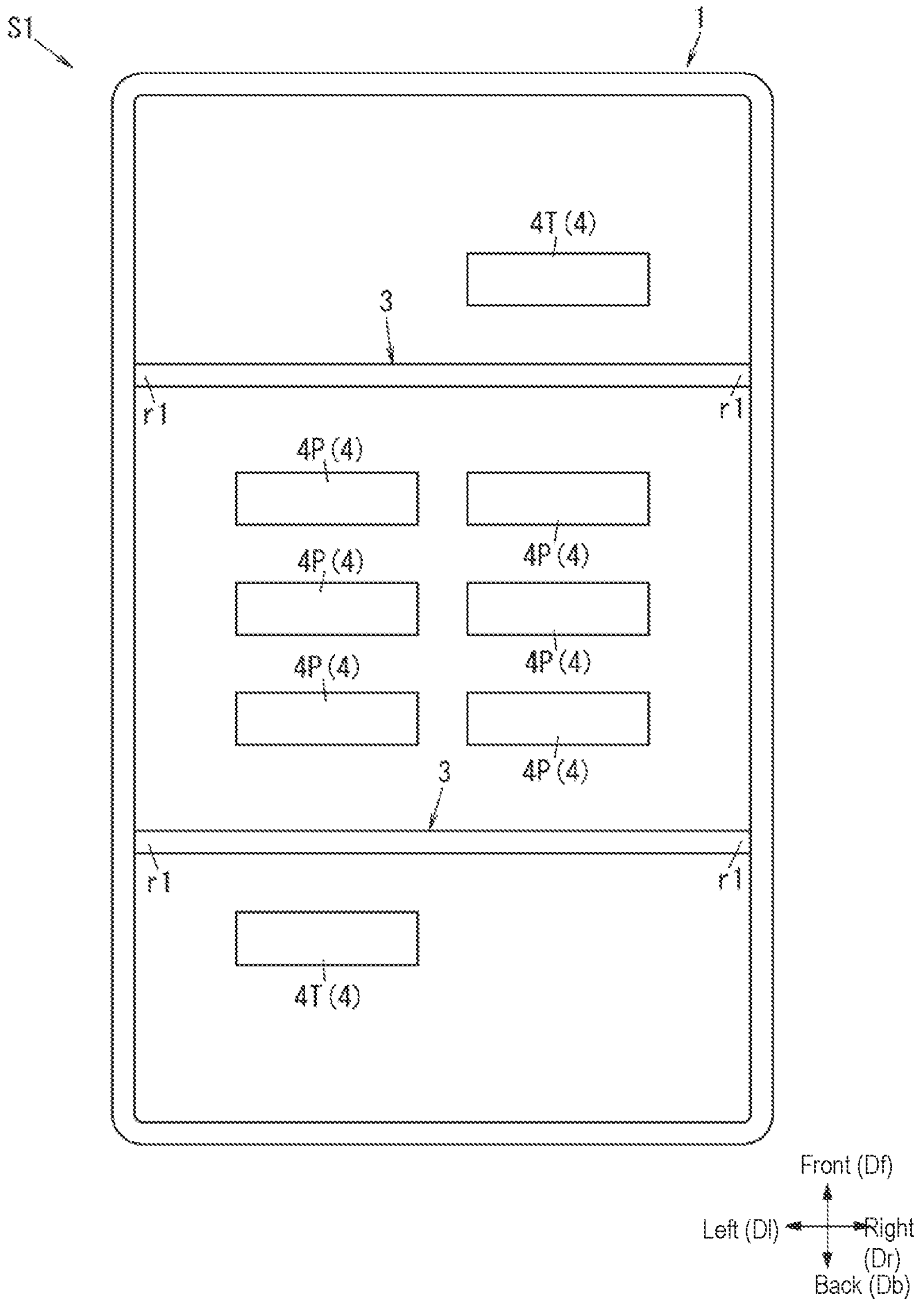
FIG. 21 is a bottom view of another modification example of the socket.

As illustrated in FIG. 21, in socket S1, at least one (both in FIG. 21) of two tip regions r1 of inner shield 3 may be directly connected to outer shield 1. Similarly, in header H1, at least one of two tip regions r7 of inner shield 7 may be directly connected to outer shield 5. For example, the length of inner shield 3 (7) may be larger in comparison to that in the exemplary embodiment, and thus inner shield 3 (7) may be connected to outer shield 1 (5) by, e.g. welding, press fitting or caulking. Alternatively, a portion of inner shield 3 (7) including tip region r1 (r7) and at least a portion of outer shield 1 (5) may be made of one member. Inner shield 3 (7) may be seamlessly connected to outer shield 1 (5).

Extension 32 (or 72) does not necessarily protrude from base 31 (or 71) in up-down direction Dud. For example, extension 32 (or 72) may protrude from base 31 (or 71) in front-back direction Dfb.

The number of the components of the connector in the exemplary embodiment is just an example, and is not limited to the number described in the exemplary embodiment. For example, the number of extensions 32 (72) of inner shield 3 (7) may be appropriately changed. The number of terminals 4 (8) of each of the connectors (socket S1 and header H1) may be appropriately changed. Each of the connector may include only low-frequency terminal 4P (8P) out of terminal 4 (8), or may include only high-frequency terminal 4T (8T) out of terminal 4 (8).

The portion formed as the recess or the dent in the exemplary embodiment may be appropriately replaced with a through-hole. On the contrary, the portion formed as a through-hole in the exemplary embodiment may be appropriately replaced with a recess or a dent.

In the exemplary embodiment, the portions coupled by press fitting may be coupled by insert molding. On the contrary, in the exemplary embodiment, the portions coupled by insert molding may be coupled by press fitting. Instead of press fitting or insert molding, another bonding method, such as bonding, welding, or caulking may be adopted.

Outer shields 1 and 5 are formed by, for example, molding instead of drawing. Thus, at least a portion (for example, entirety of the outer circumferential surfaces 101 and 501) of the surfaces of outer shields 1 and 5 may be seamlessly formed. For example, at least a portion of the surfaces of outer shields 1 and 5 may be seamlessly formed by welding.

Plural protrusions 56 of outer shield 5 may be provided on inner circumferential surface 503 instead of outer circumferential surface 501 of tubular portion 50.

A portion of the configuration of socket S1 in the exemplary embodiment may be appropriately applied to header H1. On the contrary, a portion of the configuration of header H1 in the exemplary embodiment may be appropriately applied to socket S1. For example, plural protrusions 56 may be provided on both outer shields 1 and 5, or may be provided only on outer shield 1 among outer shields 1 and 5.

In the exemplary embodiment, terms, such as the up-down direction, the front-back direction, and the left-right direction, indicating directions indicate relative directions determined only by the relative positional relation between constituent members of the connector and the mating connector, and do not indicate absolute directions such as a vertical direction.

Overview

The following aspects are disclosed from the exemplary embodiment described above.

According to a first aspect, the connector (socket S1 or S2, or header H1 or H2) includes plural terminals (4 or 8). Each of the terminals (4 or 8) are electrically connected to respective one of mating terminals of a mating connector. The connector further includes a housing (2 or 2A, or 6 or 6A) and inner shield (3 or 7). The housing (2 or 2A, or 6 or 6A) holds the terminals (4 or 8). The connector and the mating connector are connected to each other by moving at least one toward the other in a first direction (up-down direction Dud). The terminals (4 or 8) includes two terminals (4 or 8). The two terminals (4 or 8) are arranged on both sides of the inner shield (3 or 7) in a second direction (front-back direction Dfb) perpendicular to the first direction. The inner shield (3 or 7) includes the base (31 or 71) and the extension (32 or 72). The base (31 or 71) has a length in a third direction (left-right direction Dlr) perpendicular to the first and second directions. The extension (32 or 72) protrudes from the base (31 or 71). The housing (2 or 2A, or 6 or 6A) includes a shield holder (accommodation portion 28 or 68). The shield holder (accommodation portion 28 or 68) holds the extension (32 or 72).

The above configuration allowing the two terminals (4 or 8) to be arranged on both sides of the inner shield (3 or 7) reduces noise propagation between the two terminals (4 or 8) in comparison to a connector where the inner shield (3 or 7) is not provided. The extension (32 or 72) of the connector is positioned by the shield holder (accommodation portion 28 or 68), thereby improving the accuracy of alignment between the extension (32 or 72) of the connector and the mating connector.

According to a second aspect, in the connector (socket S1 or S2, or header H1 or H2) according to the first aspect, the extension (32 or 72) protrudes in the first direction toward the mating connector side when the connector and the mating connector are transitioned from the disconnected state to the connected state.

The above configuration reduces a space occupied by the extension (32 or 72) when viewed from the first direction in comparison to a connector where the extension (32 or 72) protrudes in, e.g. the second direction.

According to a third aspect, in the connector (socket S1 or S2, or header H1 or H2) according to the second aspect, the housing (2 or 2A, or 6 or 6A) includes a wall portion (25, 26, and 27, or 65). The wall portion (25, 26, and 27, or 65) has a thickness in the third direction. The wall portion (25, 26, and 27, or 65) includes an accommodation portion (28 or 68) as the shield holder. The extension (32 or 72) is accommodated in the accommodation portion (28 or 68).

The above configuration secures an insulation distance of the extension (32 or 72) by the housing (2 or 2A, or 6 or 6A).

According to a fourth aspect, in the connector (socket S1 or S2, or header H1 or H2) according to any one of the first to third aspects, the extension (32 or 72) includes a contacting portion (332 or 720). The contacting portion (332 or 720) is configured to contact an inner shield of the mating connector.

The above configuration is adopted, and the extension (32 or 72) of the connector is positioned by the shield holder (accommodation portion 28 or 68), and thereby it is possible to improve the accuracy of the electrical connection between the inner shield (3 or 7) of the connector and the inner shield of the mating connector.

According to a fifth aspect, in the connector (socket S1 or S2) according to the fourth aspect, the extension (first extension 33) further includes an extension body (331). The extension body (331) protrudes from the base (31). The contacting portion (332) protrudes from the extension body (331).

The above configuration including the contacting portion (332) of the connector protruding from the extension body (331) prevents the extension (first extension 33) of the connector from contacting the inner shield of the mating connector at a position other than the contacting portion (332).

According to a sixth aspect, in the connector (socket S1 or S2, or header H1 or H2) according to the fourth or fifth aspect, the extension (32 or 72) has a plate shape. The contacting portion (332 or 720) is provided on the surface of the extension (32 or 72) along the longitudinal direction of the extension (32 or 72).

The above configuration secures the contact area between the contacting portion (332 or 720) of the connector and the inner shield of the mating connector.

According to a seventh aspect, in the connector (socket S1 or S2, or header H1 or H2) according to any one of the fourth to sixth aspects, each of the terminals (4 or 8) includes a contact portion (41 or 46, or 81 or 84). The contact portion (41 or 46, or 81 or 84) is configured to contact the mating terminal. The contacting portion (332 or 720) and the contact portion (41 or 46, or 81 or 84) of at least one of the terminals (4 or 8) are arranged in the second direction.

The above configuration simplifies the structure of the connector.

According to an eighth aspect, in the connector (socket S1 or S2, or header H1 or H2) according to any one of the first to seventh aspects, the inner shield (3 or 7) includes plural extensions (32 or 72).

The above configuration further improve the accuracy of alignment between the extension (32 or 72) of the connector and the mating connector.

According to a ninth aspect, in the connector (socket S1 or S2) according to the eighth aspect, the plural extensions (32) include a first extension (33) and a second extension (34). The first extension (33) includes a contacting portion (332). The contacting portion (332) is configured to contact an inner shield of the mating connector. The second extension (34) is held by the shield holder (accommodation portion 28).

The above configuration increases the number of extensions (32) in comparison to a connector where the extensions (32) includes only the first extension (33). Thus, it is possible to further improve the accuracy of alignment between the extension (32) of the connector and the mating connector.

According to a tenth aspect, in the connector (socket S1 or S2) according to the ninth aspect, the accommodation space of the first extension (33) in the shield holder (accommodation portion 28) is larger than the first extension (33).

The above configuration increases a tolerable error in the alignment between the first extension (33) of the connector and the mating connector.

According to an eleventh aspect, according to any one of the first to tenth aspects, the connector (socket S1 or S2, or header H1 or H2) further includes the outer shield (1 or 1A, or 5 or 5A). The outer shield (1 or 1A, or 5 or 5A) surrounds the terminals (4 or 8) and the inner shield (3 or 7).

The above configuration reduces noise propagation between the inside and the outside of the outer shield (1 or 1A, or 5 or 5A).

According to a twelfth aspect, in the connector (socket S1 or S2, or header H1 or H2) according to the eleventh aspect, the inner shield (3 or 7) includes two tip regions (r1 or r7). The outer shield (1 or 1A, or 5 or 5A) includes a first end (e1 or e5) and a second end (e2 or e6) opposite to the first end (e1 or e5). The first end (e1 or e5) is the end that is on the mating connector side when the connector and the mating connector are transitioned from the disconnected state to the connected state. The outer shield (1 or 1A, or 5 or 5A) faces at least one of the two tip regions (r1 or r7) in a region including the second end (e2 or e6) with the gap (g1 or g7).

The above configuration including at least a portion of the inner shield (3 or 7) provided on the second end (e2 or e6) side reduces noise propagation on the second end (e2 or e6) side.

According to a thirteenth aspect, in the connector (socket S1 or S2, or header H1 or H2) according to the twelfth aspect, while a circuit board (150 or 550) is not provided, the outer shield (1 or 1A, or 5 or 5A) is electrically insulated from at least one of the two tip regions (r1 or r7) via the gap (g1 or g7). The circuit board (150 or 550) is configured to be electrically connected to the outer shield (1 or 1A, or 5 or 5A).

The above configuration improves a dimensional tolerance of each of the outer shield (1 or 1A, or 5 or 5A) and the inner shield (3 or 7) in comparison to a connector where the outer shield (1 or 1A, or 5 or 5A) contacts the two tip regions (r1 or r7).

The configuration other than the first aspect is not an essential configuration for the connector (socket S1 or S2, or header H1 or H2) and may be appropriately omitted.

According to a fourteenth aspect, the connector device (100) includes the connector (socket S1 or S2, or header H1 or H2) according to any one of the first to the thirteenth aspects, and the mating connector.

The above configuration including the two terminals (4 or 8) arranged on both sides of the inner shield (3 or 7) reduces noise propagation between the two terminals (4 or 8) in comparison to a connector where the inner shield (3 or 7) is not provided. Since the extension (32 or 72) of the connector is positioned by the shield holder (accommodation portion 28 or 68), the accuracy of alignment between the extension (32 or 72) of the connector and the mating connector is improved.

What is claimed is:

1. A connector set comprising a first connector and a second connector, wherein:

the first connector is configured to be connected to the second connector by moving toward the second connector in an up-down direction relatively with respect to the second connector, the first connector includes:

a plurality of first terminals;

a first housing holding the plurality of first terminals;

a first outer shield forming a hollow space;

a first inner shield surrounded by the first outer shield; and a second inner shield surrounded by the first outer shield, the second connector includes:

a plurality of second terminals each configured to be electrically connected to a respective one of the plurality of first terminals while the first connector is connected to the second connector;

a second housing holding the plurality of second terminals;

a second outer shield;

a third inner shield surrounded by the second outer shield; and a fourth inner shield surrounded by the second outer shield, the first housing of the first connector includes:

a bottom wall having an upper surface and a lower surface opposite to the upper surface, the upper surface being directed in the up-down direction; and a wall portion protruding upward from the upper surface of the bottom wall, the wall portion being surrounded by the first outer shield, the first outer shield of the first connector includes a first portion and a second portion which face each other across the hollow space in a right direction perpendicular to the up-down direction, the first inner shield and the second inner shield of the first connector are arranged apart from each other in a front-back direction perpendicular to the up-down direction and the right direction, the third inner shield and the fourth inner shield of the second connector are arranged away from each other in the front-back direction while the first connector is connected to the second connector, the first inner shield of the first connector includes:
a base extending in the right direction; and
an extension protruding in the up-down direction from the base,
the extension of the first inner shield of the first connector has, on a cross section, of the extension, perpendicular to the front-back direction:
a first surface directed in the right direction; and
a second surface opposite to the first surface, the second surface being directed in a left direction opposite to the right direction,
while the first connector is connected to the second connector, the first surface of the extension of the first inner shield is configured to face the wall portion of the first housing,
while the first connector is connected to the second connector, the second surface of the extension of the first inner shield is configured to contact a position on the third inner shield of the second connector, the position on the third inner shield being above the upper surface of the bottom wall of the first housing,
the first portion of the first outer shield includes:
a first inner peripheral wall facing the hollow space in the right direction;
a first outer peripheral wall facing the first inner peripheral wall across a first gap in the right direction; and
a first top wall connecting the first outer peripheral wall to the first inner peripheral wall,
the second portion of the first outer shield includes:
a second inner peripheral wall facing the hollow space in a left direction opposite to the right direction;
a second outer peripheral wall facing the second inner peripheral wall across a second gap in the left direction; and
a second top wall connecting the second outer peripheral wall to the second inner peripheral wall,
the first inner shield of the first connector is disposed between two first terminals out of the plurality of first terminals,
one first terminal of the first terminals is disposed between the first inner shield and the second inner shield of the first connector,
the third inner shield of the second connector is disposed between two second terminals out of the plurality of second terminals,
one second terminal of the two second terminals is configured to be electrically connected to the one first terminal while the first connector is connected to the second connector,
the second outer shield of the second connector is configured to be disposed between the inner peripheral wall of the first portion of the first outer shield of the first connector and the extension of the first inner shield of the first connector along the right direction while the first connector is connected to the second connector.

2. The connector set of claim 1, wherein the base of the first inner shield of the first connector overlaps the first inner peripheral wall of the first portion of the first outer shield of the first connector when viewed in the up-down direction.

3. The connector set of claim 1, wherein the second outer shield of the second connector includes a portion configured to be disposed between the first inner shield of the first connector and the third inner shield of the second connector in the up-down direction while the first connector is connected to the second connector.

4. The connector set of claim 1, wherein: the first housing of the first connector further includes a peripheral wall protruding in the up-down direction from the upper surface of the bottom wall and surrounding the wall portion, the first outershield being fixed to the peripheral wall, the bottom wall has an accommodation groove therein passing from the upper surface to the lower surface of the bottom wall, and a part of the first inner shield of the first connector is accommodated in the accommodation groove.

5. The connector set of claim 1, wherein the first outer shield of the first connector seamlessly surrounds the plurality of first terminals of the first connector.

6. The connector set of claim 1, wherein one of the two first terminals of the first connector is disposed between the first inner shield and the second inner shield of the first connector.

7. The connector set of claim 1, wherein, while the first connector is connected to the second connector, the second outer shield of the second connector includes a portion configured to overlap the second inner shield of the second connector when viewed in the up-down direction.

8. The connector set of claim 1, wherein, while the first connector is connected to the second connector, the first surface of the extension of the first inner shield is configured to contact the wall portion of the first housing.

9. A connector that is the first connector of the connector set of claim 1.

10. A connector that is the second connector of the connector set of claim 1.

11. A connector set comprising a first connector and a second connector, wherein:
the first connector is configured to be connected to the second connector by moving toward the second connector in an up-down direction relatively with respect to the second connector,
the first connector includes:
a plurality of first terminals;
a first housing holding the plurality of first terminals;
a first outer shield forming a hollow space; and
a first inner shield surrounded by the first outer shield,
the second connector includes:
a plurality of second terminals each configured to be electrically connected to a respective one of the plurality of first terminals while the first connector is connected to
the second connector;
a second housing holding the plurality of second terminals;
a second outer shield; and
a second inner shield surrounded by the second outer shield,
the first outer shield of the first connecter includes a first portion and a second portion which face each other across the hollow space in a right direction perpendicular to the up-down direction,
the first inner shield of the first connector includes:
a base extending in the right direction; and
an extension protruding in the up-down direction from the base,
the first portion of the first outer shield includes:
a first inner peripheral wall facing the hollow space in the right direction;
a first outer peripheral wall facing the first inner peripheral wall across a first gap in the right direction; and
a first top wall connecting the first outer peripheral wall to the first inner peripheral wall,
the second portion of the first outer shield includes:
a second inner peripheral wall facing the hollow space in a left direction opposite to the right direction;

a second outer peripheral wall facing the second inner peripheral wall across a second gap in the left direction; and a second top wall connecting the second outer peripheral wall to the second inner peripheral wall, the first inner shield of the first connector is disposed between two first terminals out of the plurality of first terminals, the second inner shield of the second connector is disposed between two second terminals out of the plurality of second terminals, the two second terminals are configured to be connected to the two first terminals of the first connecter, respectively, while the first connector is connected to the second connector, the second inner shield of the second connector is configured to extend in the right direction while the first connector is connected to the second connector, the second outer shield of the second connector is configured to be disposed between the inner peripheral wall of the first portion of the first outer shield of the first connector and the extension of the first inner shield of the first connector along the right direction while the first connector is connected to the second connector, and while the first connector is connected to the second connector, the second outer shield of the second connector includes a portion configured to overlap the second inner shield of the second connector when viewed in the up-down direction.

12. The connector set of claim 11, wherein the base of the first inner shield of the first connector overlaps the inner peripheral wall of the first portion of the first outer shield of the first connector when viewed in the up-down direction.

13. The connector set of claim 11, wherein the second outer shield of the second connector includes a portion configured to be disposed between the first inner shield of the first connector and the second inner shield of the second connector in the up-down direction while the first connector is connected to the second connector.

14. The connector set of claim 11, wherein:

the first housing of the first connector includes:

a bottom wall having a first surface and a second surface opposite to the first surface, the first surface being directed in the up-down direction; and a peripheral wall protruding in the up-down direction from the first surface of the bottom wall, the first outer shield being fixed to the peripheral wall, the bottom wall has an accommodation groove therein passing from the first surface to the second surface of the bottom wall, and a part of the first inner shield of the first connector is accommodated in the accommodation groove.

15. The connector set of claim 11, wherein the first outer shield of the first connector seamlessly surrounds the plurality of first terminals of the first connector.

16. A connector set comprising a first connector and a second connector, wherein:

the first connector is configured to be connected to the second connector by moving toward the second connector in an up-down direction relatively with respect to the second connector, the first connector includes:

a plurality of first terminals;

a first housing holding the plurality of first terminals;

a first outer shield forming a hollow space;

a first inner shield surrounded by the first outer shield; and a second inner shield surrounded by the first outer shield, the second connector includes:

a plurality of second terminals each configured to be electrically connected to a respective one of the plurality of first terminals while the first connector is connected to the second connector;

a second housing holding the plurality of second terminals;

a second outer shield; and a third inner shield surrounded by the second outer shield, the first outer shield of the first connector includes a first portion and a second portion which face each other across the hollow space in a right direction perpendicular to the up-down direction, the first inner shield and the second inner shield of the first connector are arranged apart from each other in a direction perpendicular to the up-down direction and the right direction, the first inner shield of the first connector includes:

a base extending in the right direction; and an extension protruding in the up-down direction from the base, the first portion of the first outer shield includes:

a first inner peripheral wall facing the hollow space in the right direction;

a first outer peripheral wall facing the first inner peripheral wall across a first gap in the right direction; and a first top wall connecting the first outer peripheral wall to the first inner peripheral wall, the second portion of the first outer shield includes:

a second inner peripheral wall facing the hollow space in a left direction opposite to the right direction;

a second outer peripheral wall facing the second inner peripheral wall across a second gap in the left direction; and a second top wall connecting the second outer peripheral wall to the second inner peripheral wall, the first inner shield of the first connector is disposed between two first terminals out of the plurality of first terminals, the third inner shield of the second connector is disposed between two second terminals out of the plurality of second terminals, the second outer shield of the second connector is configured to be disposed between the inner peripheral wall of the first portion of the first outer shield of the first connector and the extension of the first inner shield of the first connector along the right direction while the first connector is connected to the second connector, and the second outer shield of the second connector includes a portion configured to be disposed between the first inner shield of the first connector and the third inner shield of the second connector in the up-down direction while the first connector is connected to the second connector.

17. The connector set of claim 16, wherein the base of the first inner shield of the first connector overlaps the first inner peripheral wall of the first portion of the first outer shield of the first connector when viewed in the up-down direction.

18. The connector set of claim 16, wherein:

the first housing of the first connector includes:

a bottom wall having a first surface and a second surface opposite to the first surface, the first surface being directed in the up-down direction; and a peripheral wall protruding in the up-down direction from the first surface of the bottom wall, the first outer shield being fixed to the peripheral wall, the bottom wall has an accommodation groove therein passing from the first surface to the second surface of the bottom wall, and a part of the first inner shield of the first connector is accommodated in the accommodation groove.

19. The connector set of claim 16, wherein the first outer shield of the first connector seamlessly surrounds the plurality of first terminals of the first connector.

20. The connector set of claim 16, wherein one of the two first terminals of the first connector is disposed between the first inner shield and the second inner shield of the first connector.

* * * * *